US012781894B2

(12) United States Patent
Langerholc

(10) Patent No.: US 12,781,894 B2
(45) Date of Patent: Nov. 3, 2026

(54) COUPLER ASSEMBLY

(71) Applicant: LANGERTECH PTY LTD, Cranbourne West (AU)

(72) Inventor: Marko Langerholc, Melbourne (AU)

( * ) Notice: Subject to any disclaimer, the term of this patent is extended or adjusted under 35 U.S.C. 154(b) by 72 days.

(21) Appl. No.: 19/080,219

(22) Filed: Mar. 14, 2025

(65) Prior Publication Data

US 2025/0314340 A1 Oct. 9, 2025

Related U.S. Application Data

(60) Provisional application No. 63/575,381, filed on Apr. 5, 2024.

(51) Int. Cl.
*F16L 37/084* (2006.01)
*F16L 37/00* (2006.01)

(52) U.S. Cl.
CPC ........... *F16L 37/084* (2013.01); *F16L 37/002* (2013.01)

(58) Field of Classification Search
CPC ....... F16L 37/084; F16L 37/002; F16L 37/15; F16L 37/16; F16L 37/62; F16L 37/0842; E21B 33/038; E21B 33/0387
See application file for complete search history.

(56) References Cited

U.S. PATENT DOCUMENTS 2,962,096 A * 11/1960 Knox .................... E21B 33/038 166/341
3,347,567 A * 10/1967 Watkins ................ E21B 33/038 285/85
3,608,932 A * 9/1971 Brown .................. E21B 33/038 285/912
3,986,729 A * 10/1976 Taylor ................... F16L 37/002 285/18
4,200,312 A * 4/1980 Watkins .............. E21B 17/0853 285/96
4,326,328 A * 4/1982 Watkins ................ E21B 17/046 29/237
4,469,136 A * 9/1984 Watkins .............. E21B 33/0387 166/344

(Continued)

FOREIGN PATENT DOCUMENTS

GB 2155133 A 9/1985

OTHER PUBLICATIONS

European Search Report issued in EP App. No. 25164445.3 dated Jul. 21, 2025 (6 pages).

*Primary Examiner* — Aaron M Dunwoody

(57) ABSTRACT

A coupler assembly includes a male coupler assembly and a female coupler assembly. The male coupler body includes an annular locking ring. The female coupler assembly includes locking dogs that abut the locking ring when the male coupler assembly is fully inserted into the female coupler assembly and can be displaced radially outward as the male coupler assembly is inserted into the female coupler assembly. The female coupler assembly includes a piston that is movable using one or more linear actuators such that movement of the piston engages a seal assembly to form a seal between the male coupler assembly and the female coupler assembly. The female coupler assembly also includes a collar that is also moved by the linear actuators that holds the locking dogs into engagement with the locking ring, retaining the male coupler assembly to the female coupler assembly.

18 Claims, 24 Drawing Sheets

(56) References Cited

U.S. PATENT DOCUMENTS

| | | | | | |
|---|---|---|---|---|---|
| 4,491,345 | A * | 1/1985 | Regan | E21B 33/038 285/920 |
| 4,496,172 | A * | 1/1985 | Walker | E21B 33/038 285/321 |
| 4,593,937 | A * | 6/1986 | Schawann | E21B 43/013 166/344 |
| 4,823,878 | A * | 4/1989 | Brammer | E21B 33/038 166/359 |
| 4,902,044 | A * | 2/1990 | Williams | F16L 37/002 166/344 |
| 5,120,085 | A | 6/1992 | Shin | |
| 5,433,274 | A * | 7/1995 | Graff | E21B 33/038 166/368 |
| 10,858,901 | B1 * | 12/2020 | Rahim | F16L 37/142 |
| 11,486,206 | B2 * | 11/2022 | Wood | E21B 19/16 |
| 2004/0102069 | A1 * | 5/2004 | Singeetham | F16L 37/122 439/157 |
| 2005/0146137 | A1 * | 7/2005 | Davidson | F16L 37/62 285/322 |
| 2010/0288503 | A1 * | 11/2010 | Cuiper | E21B 33/038 285/308 |
| 2015/0069755 | A1 * | 3/2015 | Bull | F16L 37/122 29/450 |
| 2015/0083430 | A1 * | 3/2015 | Jahnke | F16L 37/002 166/338 |
| 2019/0145213 | A1 * | 5/2019 | Kibler | E21B 34/02 166/379 |
| 2022/0010644 | A1 * | 1/2022 | Murphy | E21B 33/043 |
| 2025/0314340 | A1 * | 10/2025 | Langerholc | F16L 37/084 |

* cited by examiner

COUPLER ASSEMBLY

CROSS-REFERENCE TO RELATED APPLICATIONS

This application is a nonprovisional application which claims priority from U.S. provisional application No. 63/575,381, filed Apr. 5, 2024, which is incorporated by reference herein in its entirety.

TECHNICAL FIELD/FIELD OF THE DISCLOSURE

The present disclosure relates generally to couplers and specifically to automated coupler assemblies.

BACKGROUND OF THE DISCLOSURE

Conduit couplers are used in many industries to couple supply pipes to pieces of equipment. In some instances, the media carried through the coupler may be highly pressurized, volatile or may exist in environments that are hazardous to personnel operating the couplers. Typical couplers are manually actuated by the installation of multiple fasteners such as bolts. Personnel must be physically present at the coupler during maintenance or the make-up and break-out procedures. The extended time interval spent installing and maintaining such couplers increases the exposure time to hazardous conditions and may increase production downtime. Furthermore, any failure to fully secure the coupling may result in leaks of volatile media into the already hazardous environment, resulting in further risk of damage to equipment and injury to on-site personnel.

SUMMARY

The present disclosure provides for a coupler assembly. The coupler assembly may include a male coupler assembly. The male coupler assembly may include a male coupler body. The male coupler body may be tubular such that the interior of the male coupler body forms a male bore. The male coupler body may include a locking ring, the locking ring being an annular protrusion from the outer surface of the male coupler body. The coupler assembly may include a female coupler assembly. The female coupler assembly may include a female coupler body. The female coupler body may be tubular such that the interior of the female coupler forms a female bore. The female coupler body may include a receiving socket adapted to receive the male coupler assembly. The female coupler assembly may include a locking dog, the locking dog adapted to be received by a locking dog aperture formed in the female coupler body. The locking dog may be positioned to abut the locking ring when the male coupler assembly is fully inserted into the female coupler assembly. The female coupler assembly may include a piston, the piston being generally tubular. The piston may be positioned within the receiving socket. The piston may be longitudinally slidable relative to the female coupler body. The female coupler assembly may include an inner ring, the inner ring positioned within the receiving socket and coupled to the female coupler body such that the annular space defined by the piston and the inner ring about the male coupler body defines a seal assembly pocket. The female coupler assembly may include a seal assembly positioned within the seal assembly pocket, the seal assembly including two or more seal rings and one or more spacers positioned between the seal rings. The female coupler assembly may include a collar, the collar being tubular and positioned about the receiving socket of the female coupler body, the collar longitudinally slidable relative to the female coupler body. The female coupler assembly may include a linear actuator, the linear actuator coupled to the female coupler body and the collar such that extension of the linear actuator causes the collar to move from an unlocked position to a locked position such that the collar abuts the locking dog when in the locked position and such that the piston is moved from an unsealed to a sealed position in which the seal rings are longitudinally compressed when in the sealed position.

The present disclosure also provides for a method. The method may include coupling a male coupler assembly of a coupler assembly to a first piece of equipment at a first end connection of the coupler assembly. The male coupler assembly may comprise a male coupler body, the male coupler body being tubular, the interior of the male coupler body forming a male bore. The male coupler body may include a locking ring, the locking ring being an annular protrusion from the outer surface of the male coupler body. The method may include coupling a female coupler assembly of the coupler assembly to a second piece of equipment at a second end connection of the coupler assembly. The female coupler assembly may include a female coupler body, the female coupler body being tubular, the interior of the female coupler forming a female bore. The female coupler body may include a receiving socket adapted to receive the male coupler assembly. The female coupler assembly may include a locking dog, the locking dog adapted to be received by a locking dog aperture formed in the female coupler body. The locking dog may be positioned to abut the locking ring when the male coupler assembly is fully inserted into the female coupler assembly. The female coupler assembly may include a piston, the piston being generally tubular, the piston positioned within the receiving socket, the piston longitudinally slidable relative to the female coupler body between an unsealed position and a sealed position. The female coupler assembly may include an inner ring, the inner ring positioned within the receiving socket and coupled to the female coupler body such that the annular space defined by the piston and the inner ring about the male coupler body defines a seal assembly pocket. The female coupler assembly may include a seal assembly positioned within the seal assembly pocket, the seal assembly including two or more seal rings and one or more spacers positioned between the seal rings. The female coupler assembly may include a collar, the collar being tubular and positioned about the receiving socket of the female coupler body, the collar longitudinally slidable relative to the female coupler body between an unlocked position and a locked position. The female coupler assembly may include a linear actuator, the linear actuator coupled to the female coupler body and the collar such that extension of the linear actuator causes the collar to move from an unlocked position to a locked position. The method may include inserting the male coupler body into the female coupler body of the female coupler assembly and within the seal assembly. The method may include engaging the locking ring to the locking dog. The method may include forcing the locking dog radially outward such that the locking ring passes the locking dog. The method may include engaging an end face of the male coupler body to a stop face of the female coupler body. The method may include radially withdrawing the locking dog against a rear tapered surface of the locking ring. The method may include extending the linear actuator such that the collar is moved to the locked position. The method may include engaging the collar to a tapered outer surface of the locking dog such that the locking dog is constrained against the rear tapered surface of the locking ring. The method may include moving the piston to a sealed position such that the seal rings are axially compressed and expanded radially into abutment with the piston and the male coupler body. The method may include forming a seal between the female coupler assembly and the male coupler assembly.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
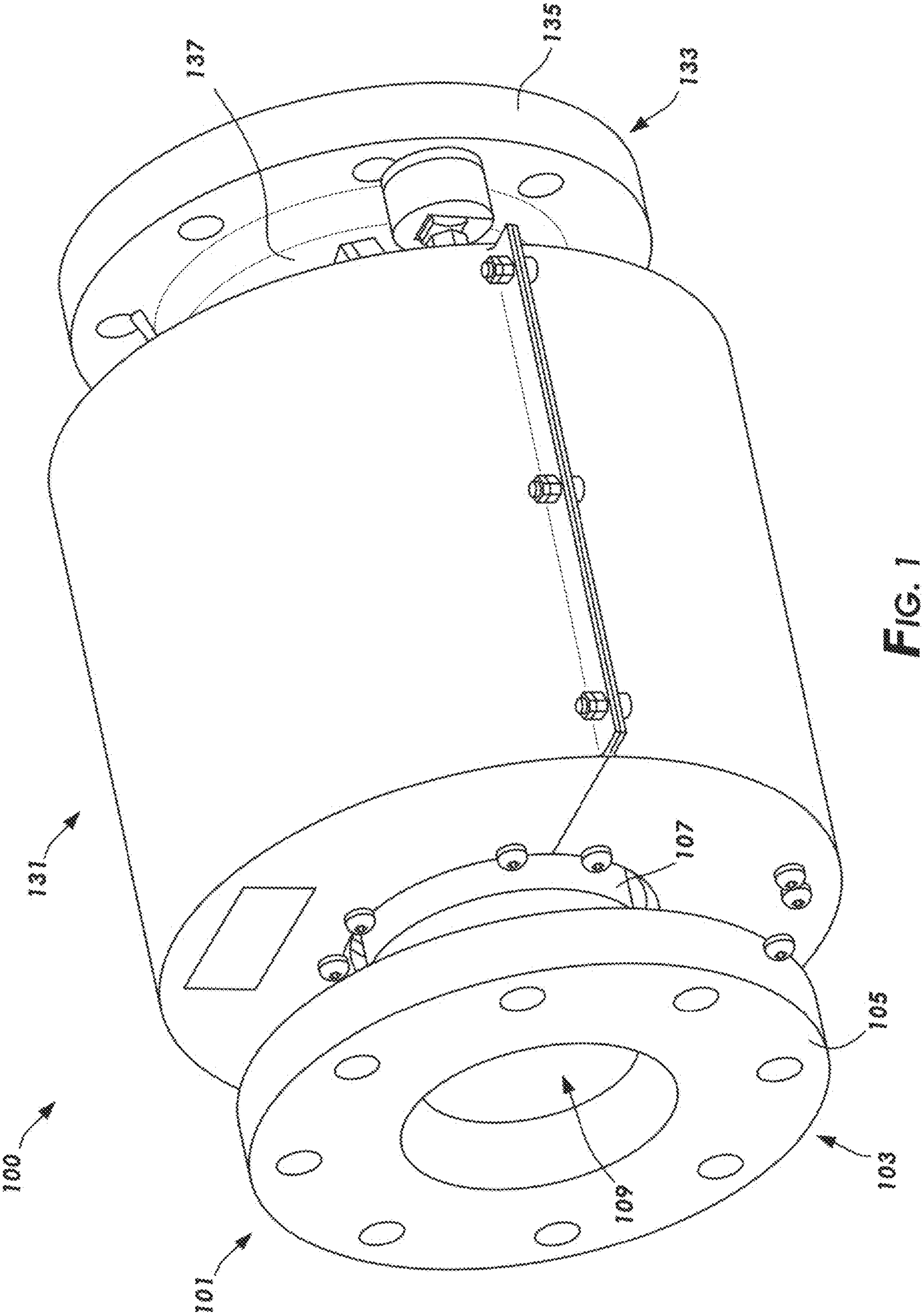
FIG. 1 depicts a perspective view of a coupler assembly consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
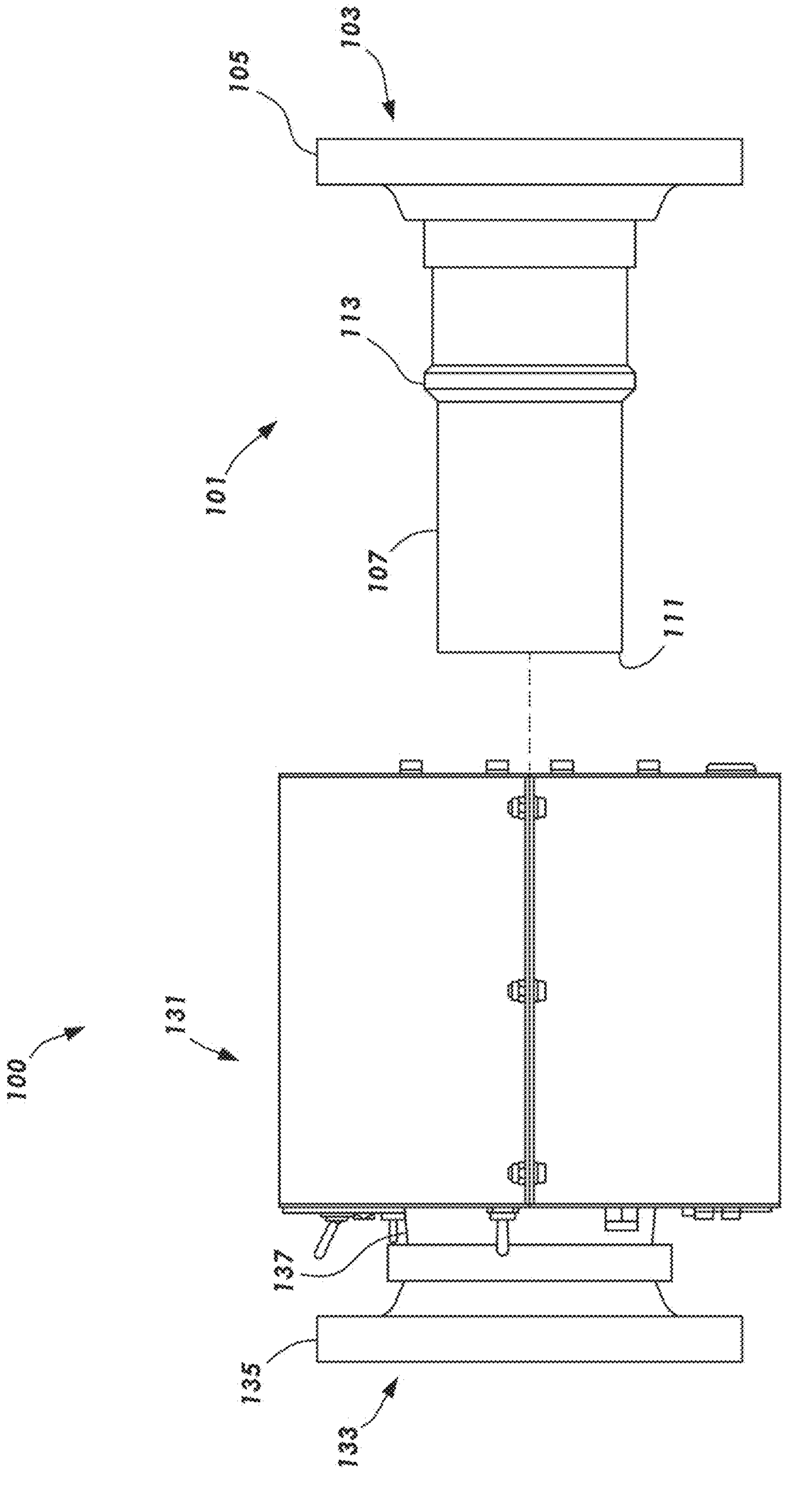
FIG. 2 depicts a side view of a coupler assembly consistent with at least one embodiment of the present disclosure in a decoupled configuration.
Figure 3:
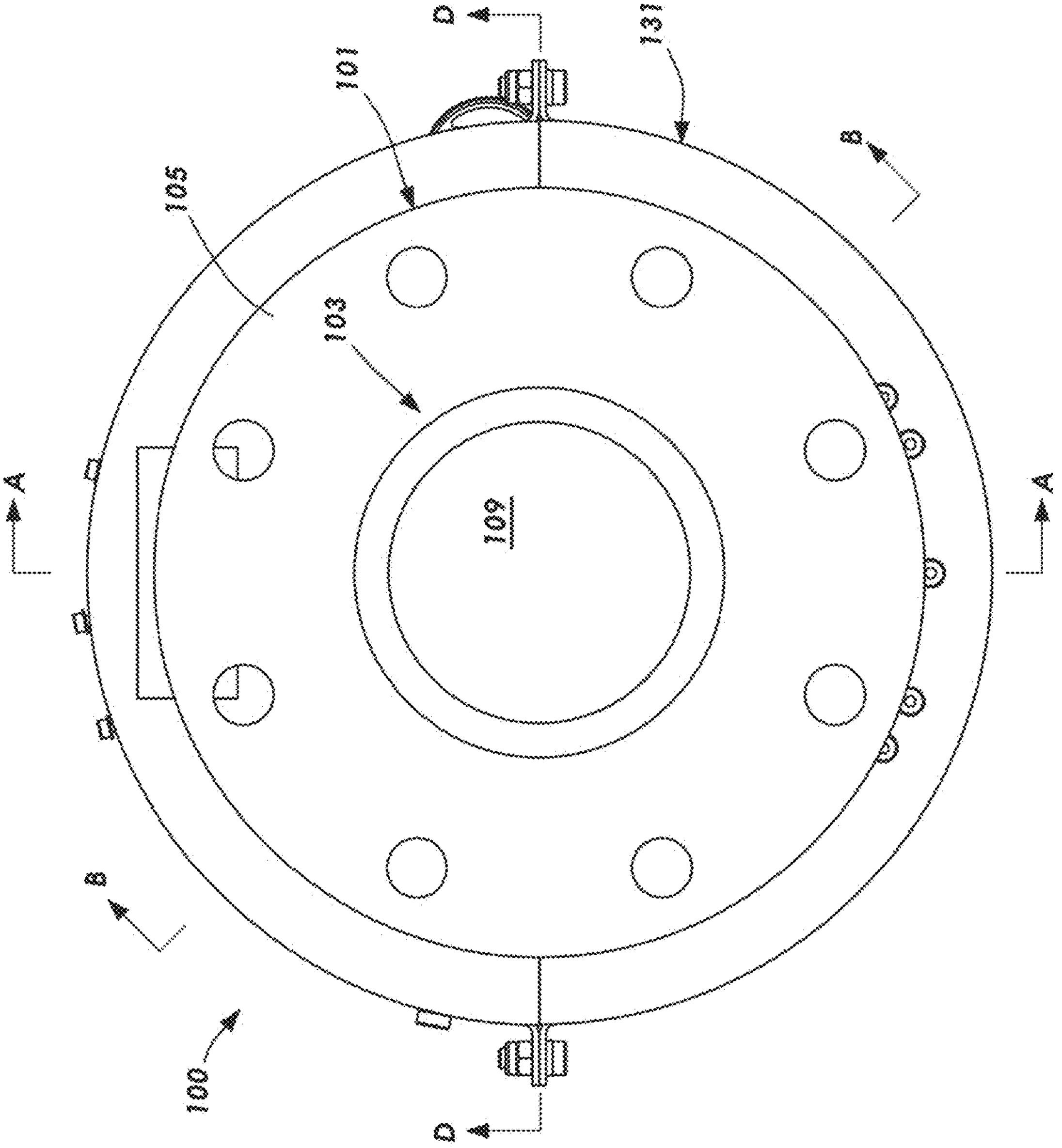
FIG. 3 depicts an end view of a coupler assembly consistent with at least one embodiment of the present disclosure.

FIGS. 1, 2 depict coupler assembly 100. Coupler assembly 100 may include male coupler assembly 101 and female coupler assembly 131. As described further herein below, female coupler assembly 131 may be adapted to receive male coupler assembly 101 such that male coupler assembly 101 is insertable into female coupler assembly 131 to form a fluid seal therebetween and such that male coupler assembly 101 is selectively mechanically locked to female coupler assembly 131. Coupler assembly 100 may include first end connection 103 formed as part of or mechanically coupled to male coupler assembly 101 and second end connection 133 formed as part of or mechanically coupled to female coupler assembly 131. First end connection 103 and second end connection 133 may each be able to be mechanically and fluidly coupled to external components including, for example, hoses, manifolds, or other equipment, such that coupler assembly 100 may allow a sealed and releasable fluid connection between components coupled to first end connection 103 and second end connection 133. In some embodiments, first end connection 103 and second end connection 133 may be, for example and without limitation, coupling flanges 105, 135, respectively. In some such embodiments, coupling flange 105 may be mechanically coupled by, for example and without limitation, a threaded coupling or welding, to male coupler body 107 at the end of male coupler assembly 101 opposite the end that is inserted into female coupler assembly 131, and coupling flange 135 may be mechanically coupled by, for example and without limitation, a threaded coupling or welding, to female coupler body 137 at the end of female coupler body 137 opposite the end that receives male coupler body 107.

FIGS. 3-6 depict views of coupler assembly 100. As shown, male coupler body 107 may be tubular such that the interior of male coupler body 107 defines male bore 109. Female coupler body 137 may be tubular such that at least part of female coupler body 137 defines female bore 139. Male bore 109 and female bore 139, together, may form a continuous bore from first end connection 103 to second end connection 133 when in a locked and sealed configuration such that a fluid path is formed therebetween.

Figure 7:
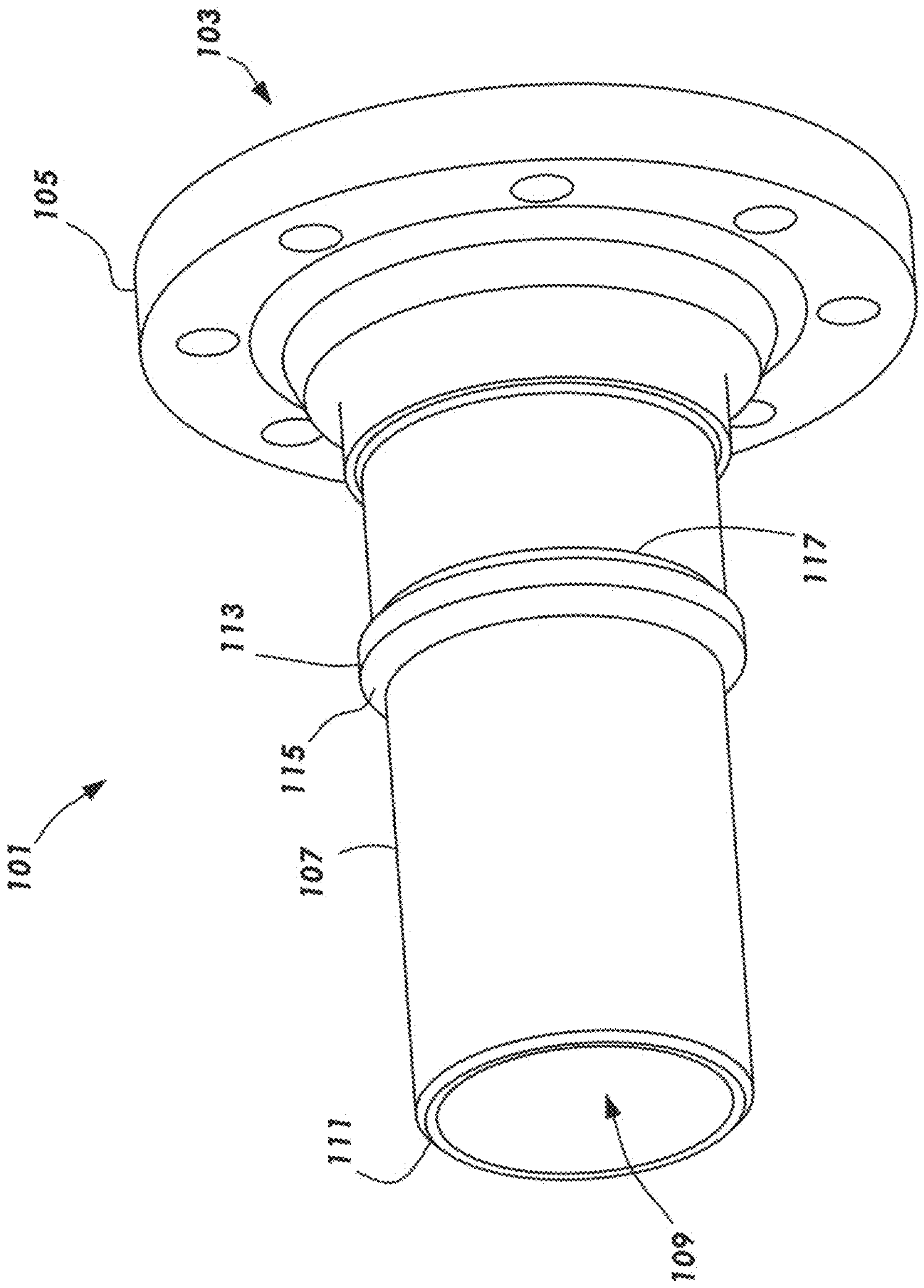
FIG. 7 depicts a perspective view of a male coupler subassembly consistent with at least one embodiment of the present disclosure.

As shown in FIG. 7, male coupler assembly 101 may include male coupler body 107. As described above, male coupler body 107 may be tubular. Coupling flange 105 may be coupled to male coupler body 107 by, for example and without limitation, a threaded or welded coupling, or coupling flange 105 and male coupler body 107 may be made together as a single part. Coupling flange 105 may be coupled to male coupler body 107 at an end of male coupler body 107 opposite end face 111 of male coupler body 107.

Male coupler body 107 may include locking ring 113. In some embodiments, locking ring 113 may be an annular protrusion from the cylindrical outer surface of male coupler body 107. Locking ring 113 may include front tapered surface 115 and rear tapered surface 117 on either side of locking ring 113. In some embodiments, locking ring 113 may be formed integrally with male coupler body 107 or may be formed separately and mechanically coupled thereto. Although described as a continuous ring, locking ring 113 may be discontinuous or may be formed from a plurality of separate extrusions.

Figure 8:
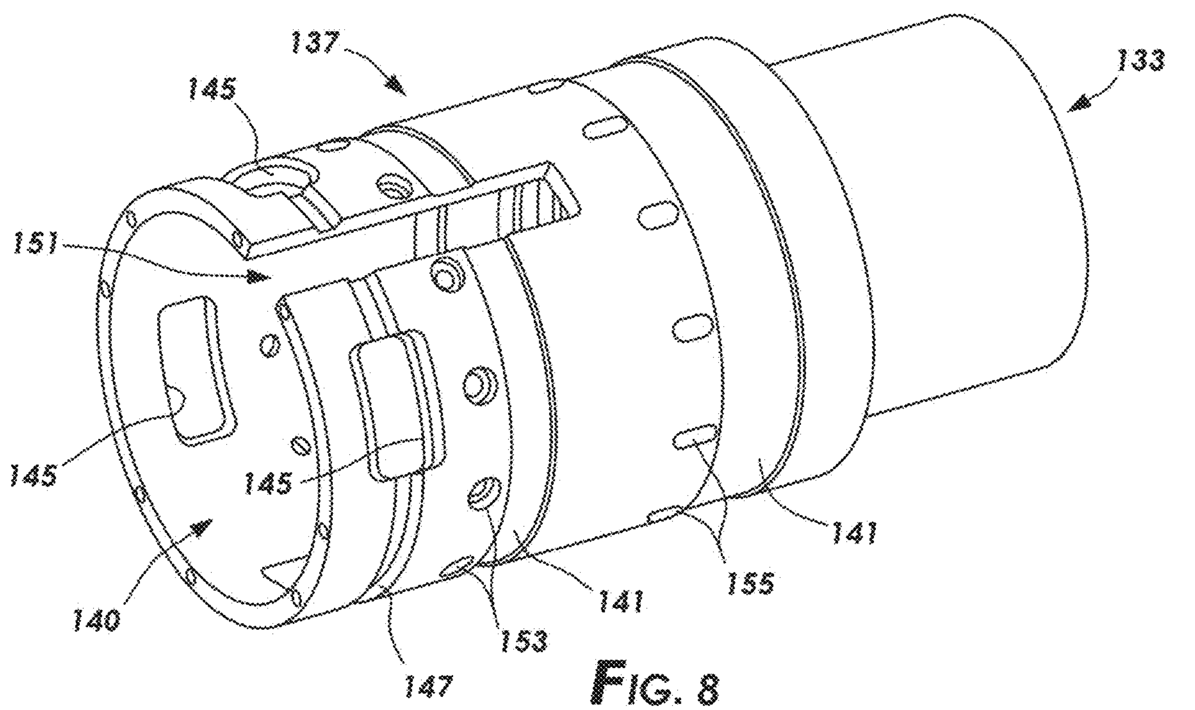
FIG. 8 depicts a perspective view of a female connector consistent with at least one embodiment of the present disclosure.
Figure 8A:
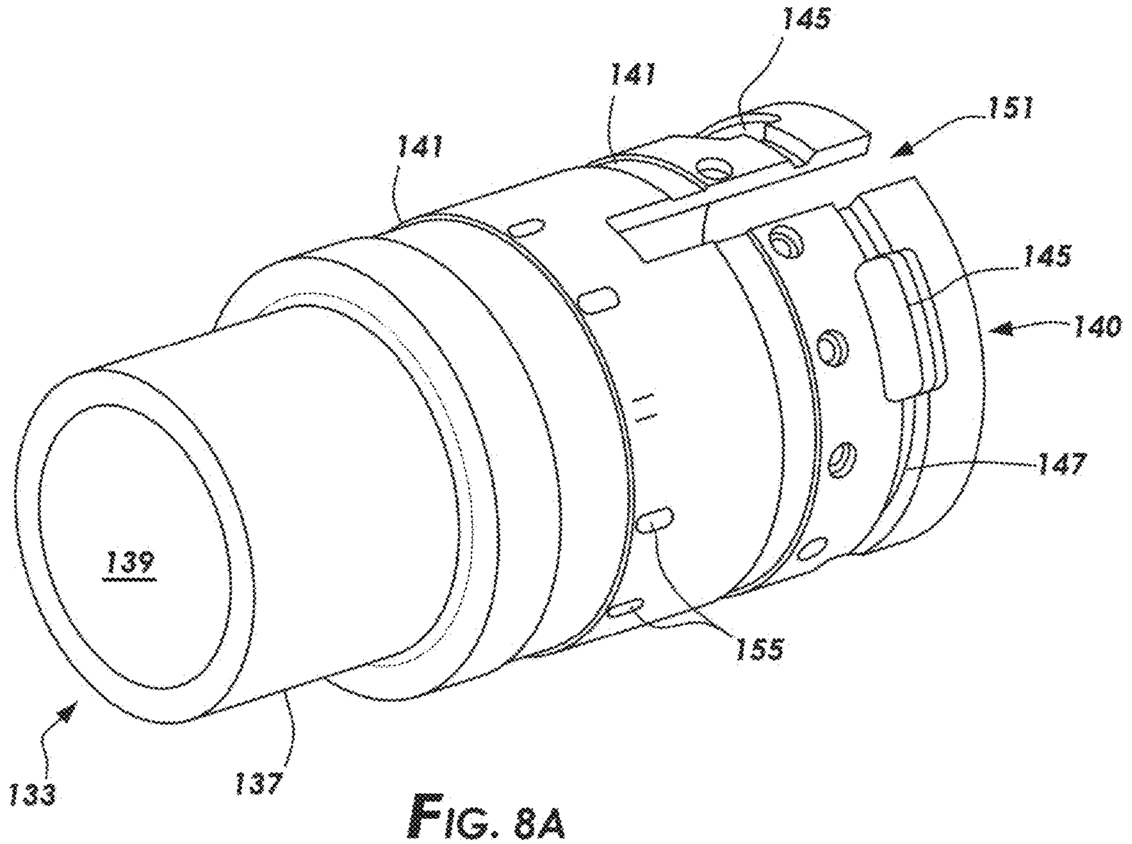
FIG. 8A depicts an alternate perspective view of the female connector of FIG. 8.

FIGS. 8, 8A depict female coupler body 137. As described above, female coupler body 137 may be substantially tubular. Coupling flange 135 (shown in FIGS. 3-6) may be coupled to female coupler body 137 by, for example and without limitation, a threaded or welded coupling, or coupling flange 135 and female coupler body 137 may be made together as a single part. Coupling flange 135 may be coupled to female coupler body 137 at an end of female coupler body 137 opposite receiving socket 140 of female coupler body 137.

In some embodiments, receiving socket 140 of female coupler body 137 may have an inner diameter larger than the outer diameter of male coupler body 107 and locking ring 113 such that male coupler body 107 can be inserted into receiving socket 140 within further components of coupler assembly 100 including piston 169, inner ring 157, seal assembly 193 and end ring 229, as further described below.

Figure 4:
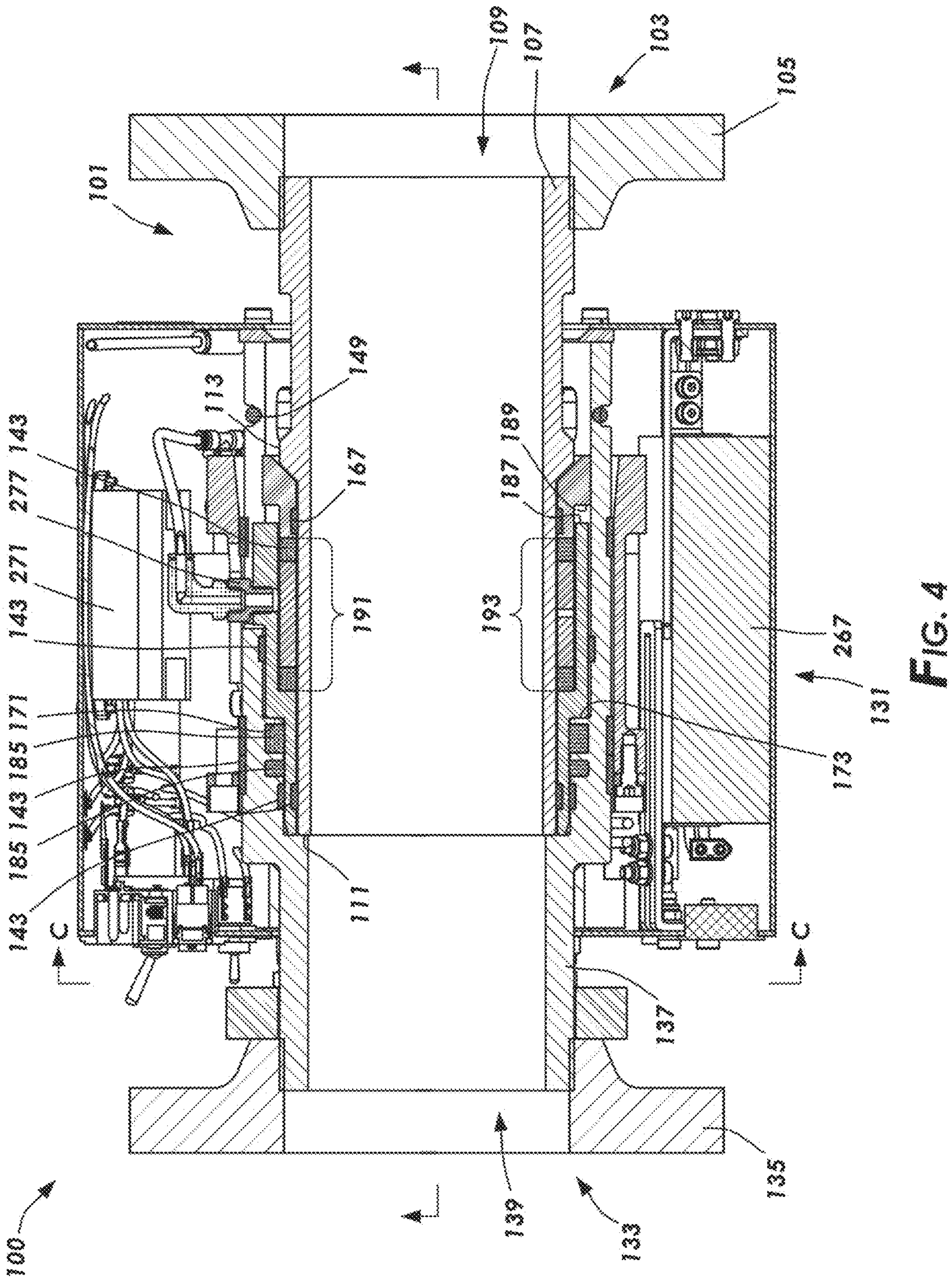
FIG. 4 depicts a cross-section view of the coupler assembly of FIG. 3 along cut line A-A.
Figure 5:
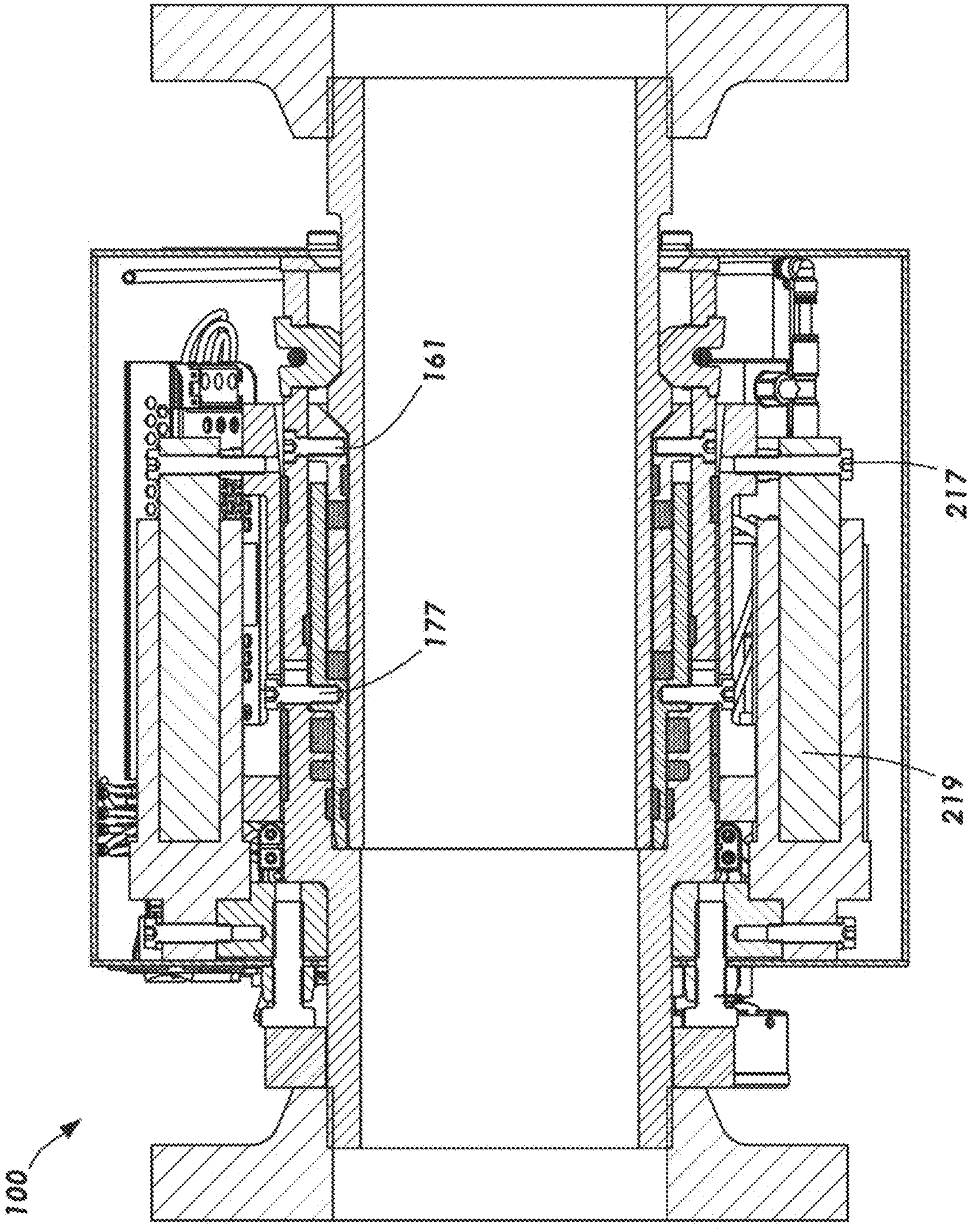
FIG. 5 depicts a cross-section view of the coupler assembly of FIG. 3 along cut line B-B.
Figure 6:
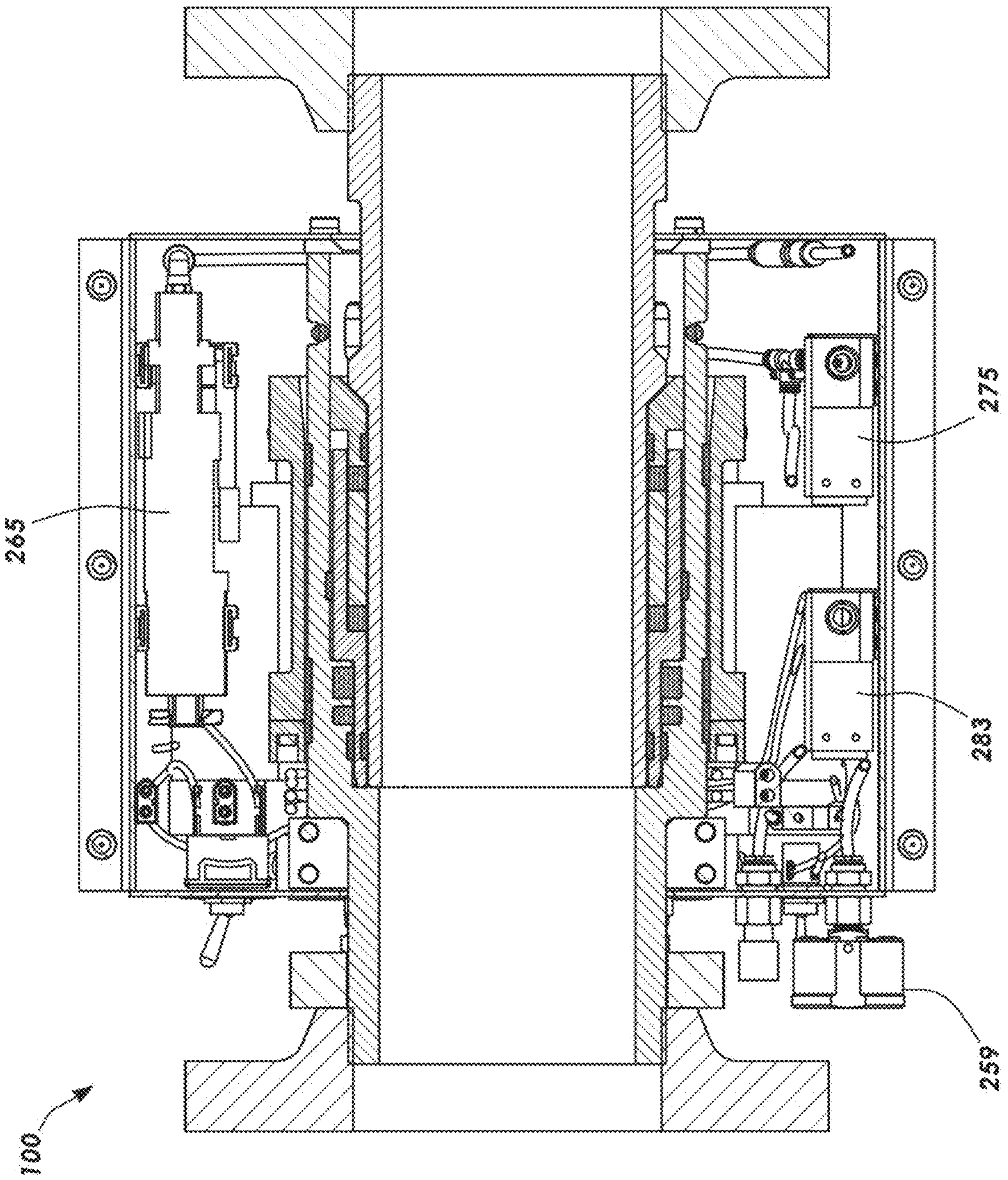
FIG. 6 depicts a cross-section view of the coupler assembly of FIG. 3 along cut line D-D.

In some embodiments, female coupler body 137 may include annular grooves 141 formed in one or both of the inner surface and the outer surface of female coupler body 137 that may be used to house guide rings 143 (shown in FIGS. 4-6). Guide rings 143 may, for example and without limitation, provide bearing surfaces between various moving parts of coupler assembly 100 to guide components into coaxial position and to reduce wear to other components.

In some embodiments, female coupler body 137 may include locking dog apertures 145 formed proximate the end of receiving socket 140. Locking dog apertures 145 may, as further described below, slidingly receive locking dogs 201 (as shown in FIG. 5). In some embodiments, female coupler body 137 may include retaining ring groove 147. Retaining ring groove 147 may be annular and may be collocated with locking dog apertures 145. Retaining ring groove 147 may, in some embodiments, receive retaining ring 149 (shown in FIGS. 4-6). Retaining ring 149 may be an annular elastomeric body such as, for example and without limitation, an O-ring.

Figure 9:
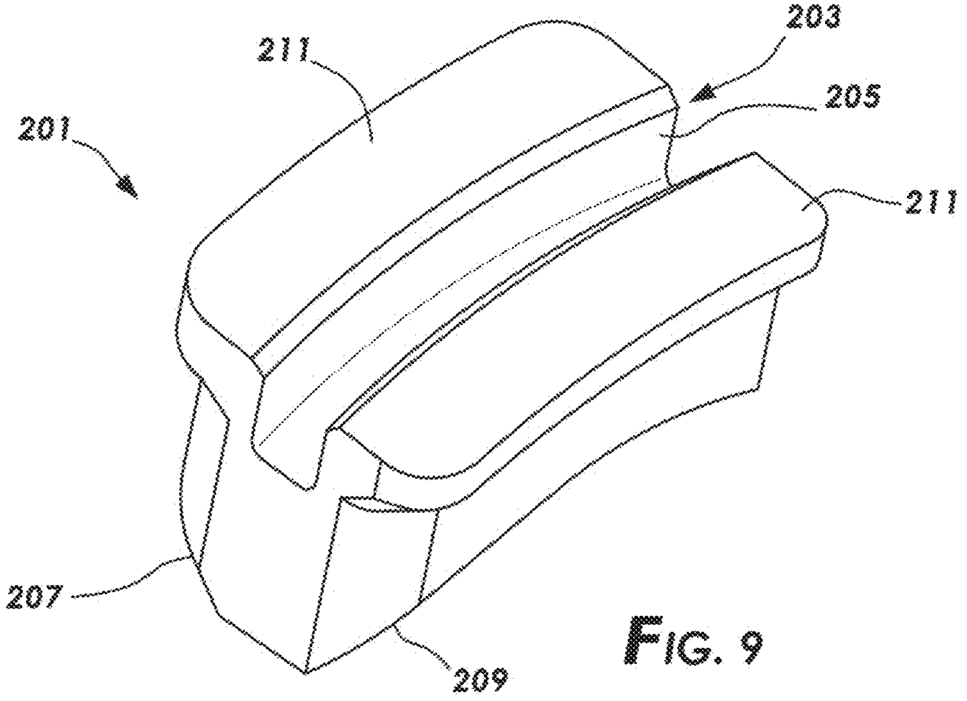
FIG. 9 depicts a perspective view of a locking dog consistent with at least one embodiment of the present disclosure.
Figure 9A:
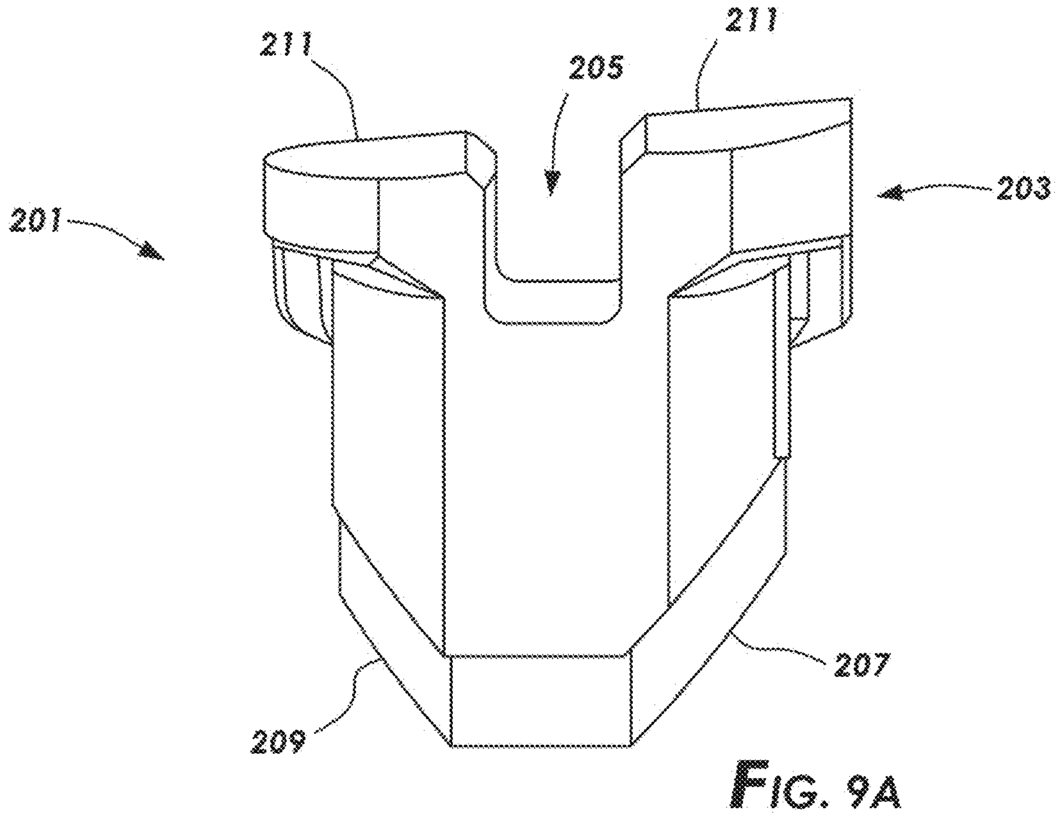
FIG. 9A depicts an end view of the locking dog of FIG. 9.

FIGS. 9, 9A depict locking dog 201 consistent with at least one embodiment of the present disclosure. Locking dog 201 may be shaped to correspond with the cross section of locking dog apertures 145. In some embodiments, locking dog 201 may include outer flange 203 positioned to limit radially inward movement of locking dog 201 relative to female coupler body 137. In some embodiments, locking dog 201 may include retaining ring slots 205 positioned to correspond with retaining ring groove 147 of female coupler body 137 and positioned to receive retaining ring 149. Retaining ring 149 may, as further described below, engage with locking dogs 201 and provide an inward bias thereon. Retaining ring 149 may thus allow locking dogs 201 to move radially outward as male coupler assembly 101 is inserted into female coupler assembly 131 and bias locking dogs 201 back into a radially retracted position once male coupler assembly 101 is fully seated or removed.

In some embodiments, locking dog 201 may include front camming surface 207 and rear camming surface 209. Front camming surface 207 may, for example and without limitation, engage with front tapered surface 115 of locking ring 113 while male coupler assembly 101 is being inserted into female coupler assembly 131 and force locking dog 201 radially outward, allowing locking ring 113 to pass locking dog 201.

Rear camming surface 209 may likewise engage with rear tapered surface 117 of locking ring 113 while male coupler assembly 101 is fully inserted into female coupler assembly 131. Rear camming surface 209 may be used to force locking dog 201 radially outward, allowing locking ring 113 to pass locking dog 201 as male coupler assembly 101 is removed from female coupler assembly 131. Additionally, when in the locked configuration and locking dog 201 is prevented from radial movement as further discussed below, rear camming surface 209 may engage rear tapered surface 117 of locking ring 113 and prevent male coupler assembly 101 from being removed from female coupler assembly 131.

In some embodiments, locking dog 201 may include tapered outer surface 211. Tapered outer surface 211 may, when coupler assembly 100 is in the locked position, engage collar 213 to prevent radial movement of locking dog 201 as further described below.

In some embodiments, with reference to FIGS. 8, 8A, female coupler body 137 may include longitudinal slot 151 formed from the end of receiving socket 140. In some embodiments, female coupler body 137 may include inner ring bolt holes 153 and piston bolt slots 155 as further described below.

Figure 10:
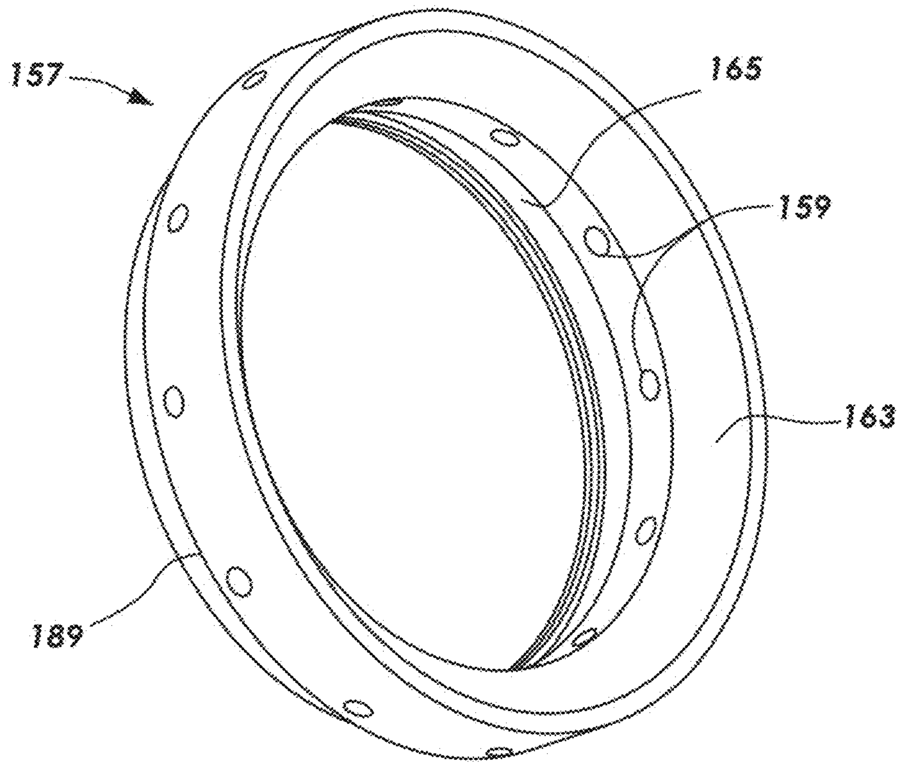
FIG. 10 depicts a perspective view of an inner ring consistent with at least one embodiment of the present disclosure.

In some embodiments, with reference to FIG. 10, coupler assembly 100 may include inner ring 157. Inner ring 157 may include inner ring bolt holes 159 positioned to receive inner ring bolts 161 (shown in FIG. 5) such that inner ring 157 is mechanically coupled to female coupler body 137. Inner ring 157 may include landing face 163. Landing face 163 may, in some embodiments, be chamfered. In some embodiments, landing face 163 may be configured, for example and without limitation, such that it corresponds to front tapered surface 115 of locking ring 113 when male coupler body 107 is fully inserted into female coupler body 137 as further described below. In some embodiments, inner ring 157 may include annular groove 165 positioned to receive guide ring 167.

Figure 11:
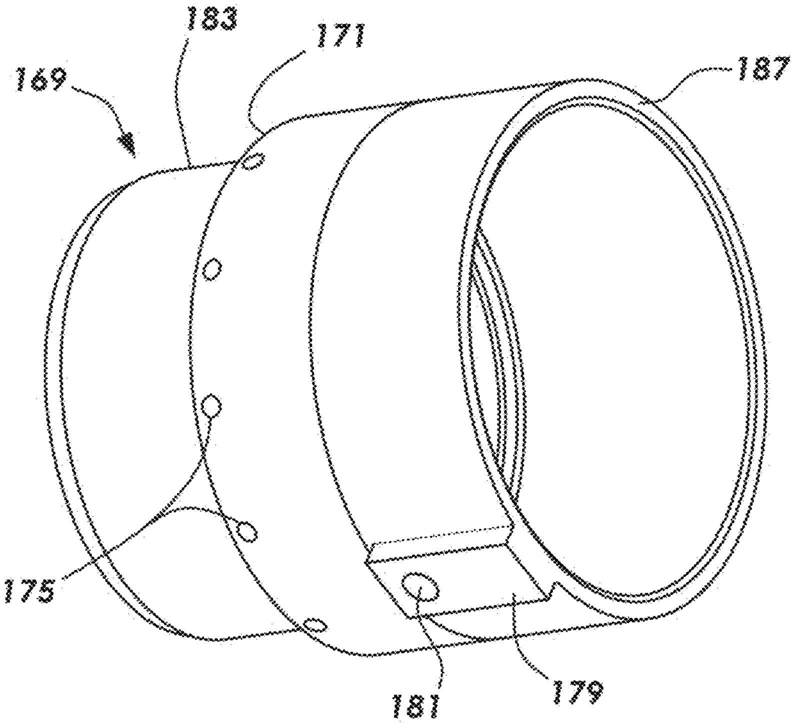
FIG. 11 depicts a perspective view of a piston consistent with at least one embodiment of the present disclosure.

In some embodiments, with reference to FIG. 11, coupler assembly 100 may include piston 169. Piston 169 may be generally tubular and may be formed to fit substantially within female coupler body 137. In some embodiments, piston 169 may include backup shoulder 171 positioned to abut against stop shoulder 173 formed on the inner surface of female coupler body 137 when coupler assembly 100 is in the fully unset position.

In some embodiments, piston 169 may include piston bolt holes 175, each positioned to receive a corresponding piston bolt 177 (shown in FIG. 5). Each piston bolt 177 may threadedly couple to piston 169 and may pass through piston bolt slots 155 of female coupler body 137. Piston bolts 177 may, for example and without limitation, be used to bias piston 169 between an unset position and a set position as further described herein below.

In some embodiments, piston 169 may include boss 179. Boss 179 may extend radially from the outer surface of piston 169 and may, in some embodiments, correspond generally to the cross section of longitudinal slot 151 of female coupler body 137. Boss 179 may thus allow relative longitudinal movement between piston 169 and female coupler body 137 while reducing or preventing rotation of piston 169 relative to female coupler body 137. In some embodiments, boss 179 may include seal testing port 181 formed through the body of piston 169. Seal testing port 181 may be used to assess the integrity of seal assembly 193 as further described herein below.

In some embodiments, at least a portion of the outer surface of piston 169 may form machined sealing surface 183. Machined sealing surface 183 may be adapted to abut one or more seals 185 (shown in FIGS. 4-6) positioned between piston 169 and the inner surface of female coupler body 137.

In some embodiments, piston 169 may include piston leading face 187. Piston leading face 187 may be configured to approach piston stop face 189 formed on inner ring 157 when coupler assembly 100 is in the fully locked position.

Figure 12:
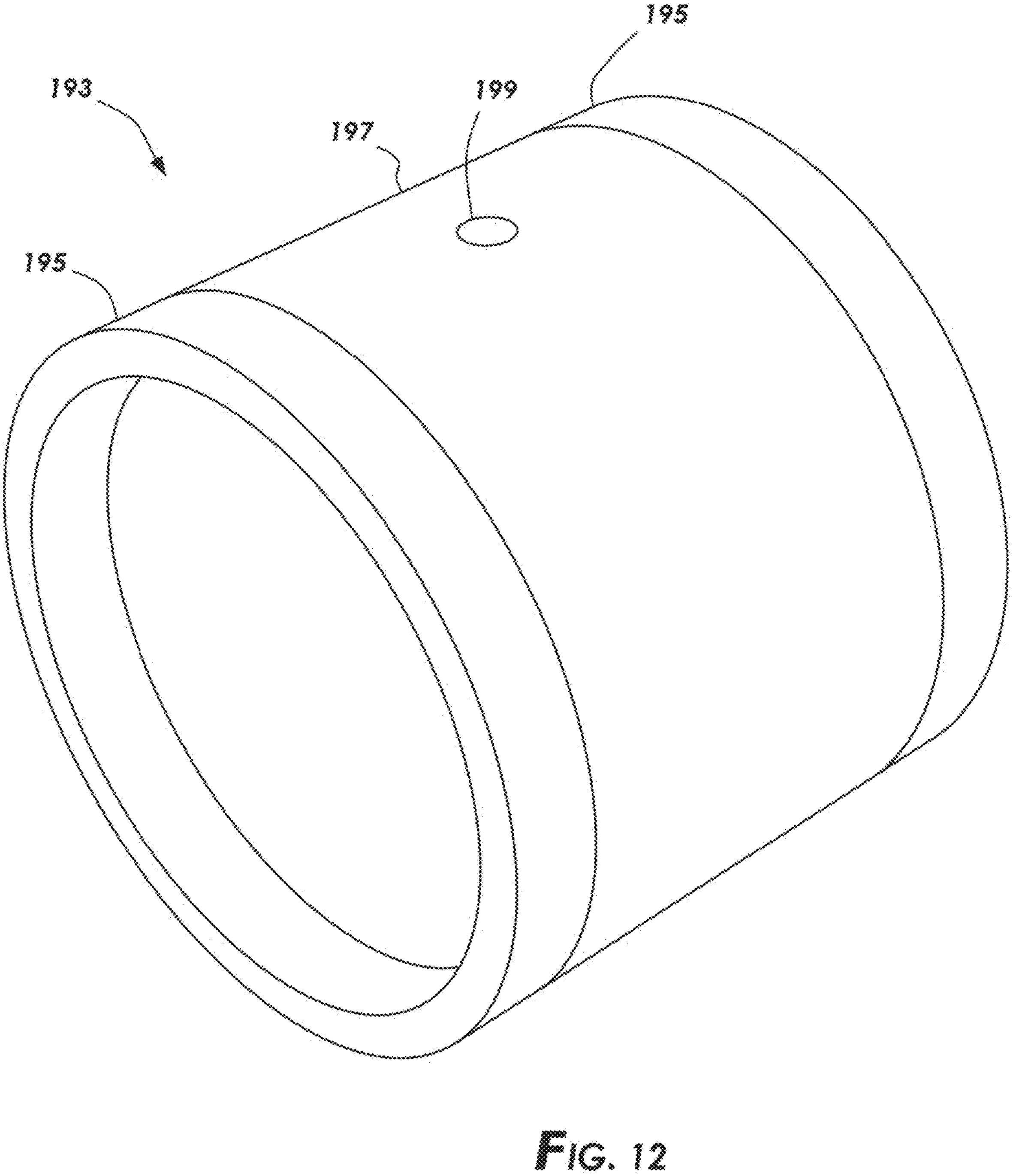
FIG. 12 depicts a seal assembly consistent with at least one embodiment of the present disclosure.

With reference to FIGS. 4-6, inner ring 157 and the inner surface of piston 169 may together form an annular pocket, defining seal assembly pocket 191. Seal assembly pocket 191 may house seal assembly 193. As shown in FIG. 12, seal assembly 193 may include seal rings 195 and one or more spacers 197. Seal rings 195 may be formed from an elastomeric material such that longitudinal compression of seal assembly 193 may cause radial expansion of seal rings 195 as further described herein below. In some embodiments, spacer 197 may include spacer seal testing hole 199 formed as a radial hole through spacer 197. Although depicted herein as using two seal rings 195 and one spacer 197, in some embodiments, seal assembly 193 may include two spacers 197 and three seal rings 195. In other embodiments, other arrangements and numbers of seal rings 195 and spacers 197 may be used without deviating from the scope of this disclosure.

Figure 13:
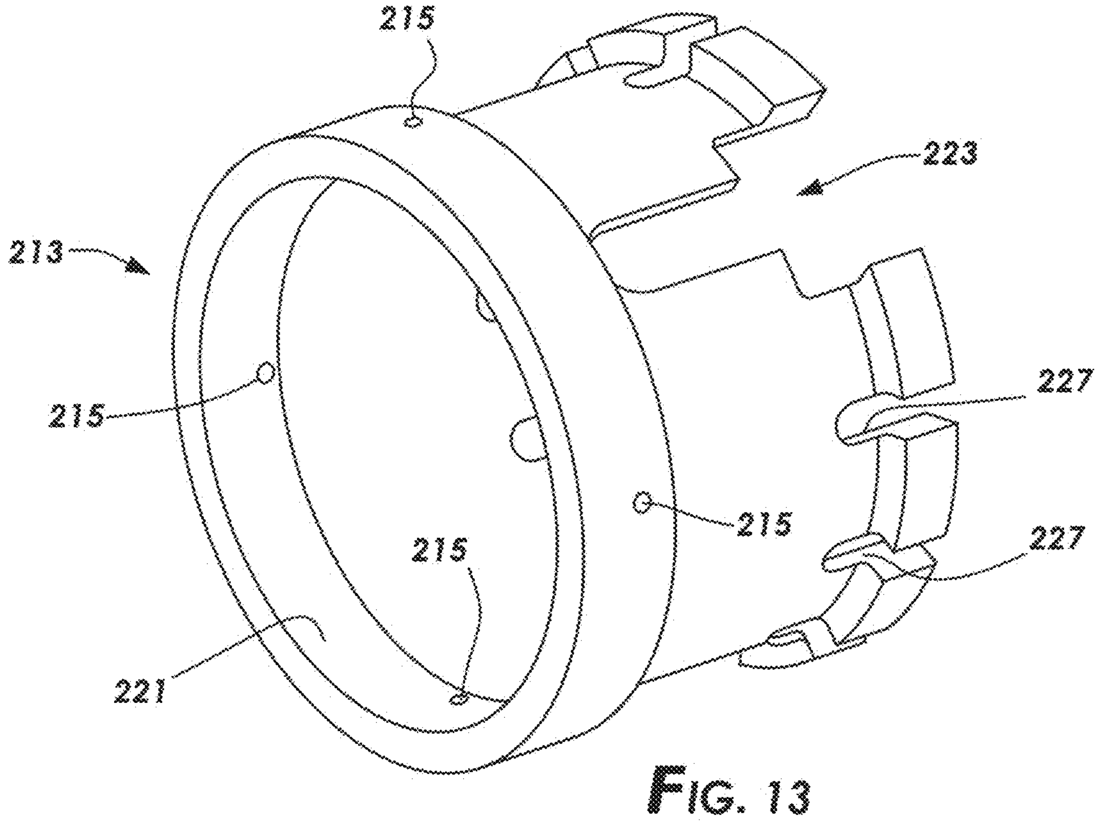
FIG. 13 depicts a perspective view of a collar consistent with at least one embodiment of the present disclosure.
Figure 13A:
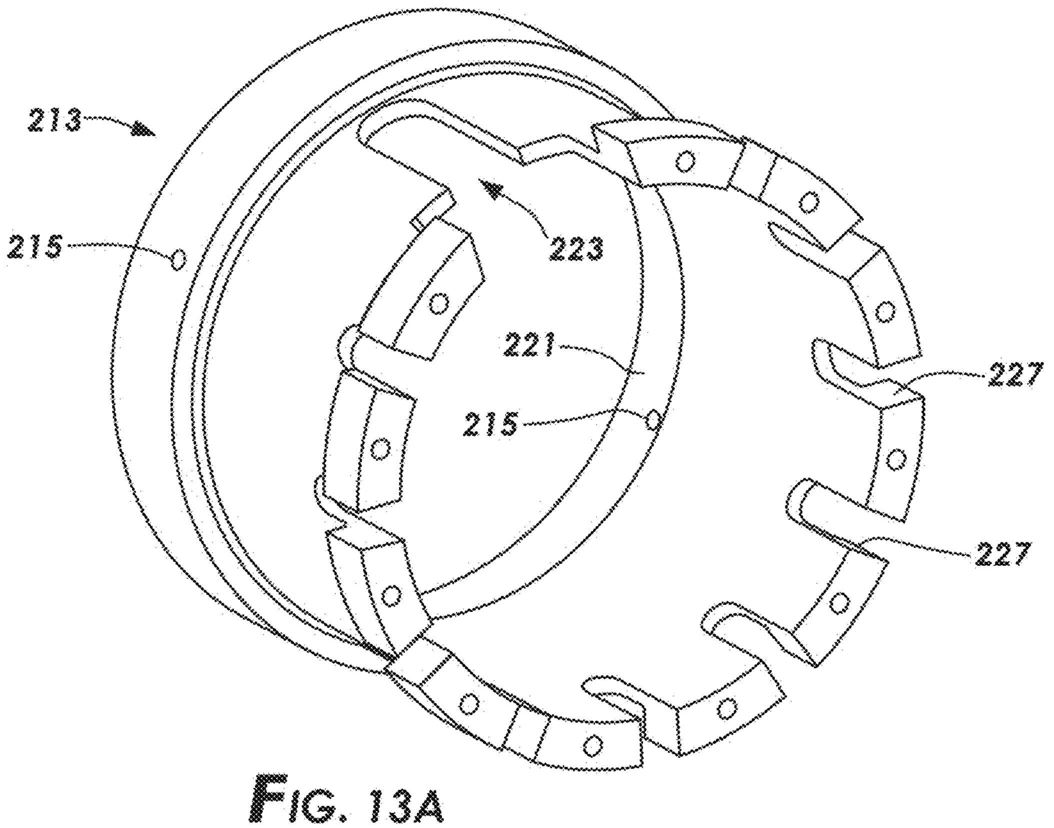
FIG. 13A depicts an alternate perspective view of the collar of FIG. 13.
Figure 13B:
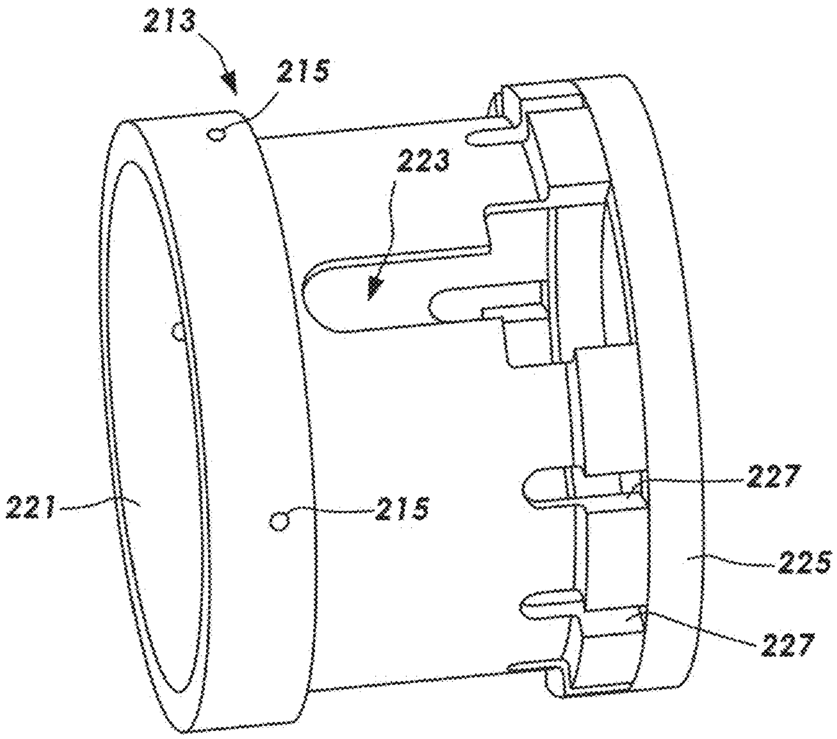
FIG. 13B depicts a perspective view of the collar of FIG. 13 with a collar extension consistent with at least one embodiment of the present disclosure coupled thereto.

Coupler assembly 100 may, in some embodiments, include collar 213 as shown in FIGS. 13, 13A, 13B. Collar 213 may be generally tubular and may be adapted to fit radially outside of female coupler body 137. Collar 213 may be adapted to slide longitudinally along female coupler body 137. In some embodiments, collar 213 may include actuator bolt holes 215. Actuator bolt holes 215 may receive actuator bolts 217. Actuator bolts 217 may couple collar 213 to linear actuators 219 (as shown in FIG. 5) and thus allow controlled longitudinal movement of collar 213 relative to female coupler body 137 using linear actuators 219. Specifically, in some embodiments, collar 213 may be movable between a retracted or unlocked position and an extended or locked position as further described herein below. Linear actuators 219 may, for example and without limitation, be electrically actuated, pneumatically actuated, or hydraulically actuated. In some embodiments, two or more linear actuators 219 may be included. In some embodiments, for example and without limitation, four linear actuators 219 may be included.

In some embodiments, collar 213 may include forcing cone 221. Forcing cone 221 may be positioned to engage tapered outer surface 211 of locking dogs 201 when collar 213 is in the extended or locked position and, in such a position, prevent locking dogs 201 from outward radial movement.

Collar 213 may, in some embodiments, include longitudinal slot 223 positioned to correspond with the location of boss 179 and longitudinal slot 151 of female coupler body 137. Longitudinal slot 223 of collar 213 may, for example and without limitation, allow for longitudinal movement of collar 213 relative to piston 169.

In some embodiments, as shown in FIG. 13B, collar 213 may be mechanically coupled to collar extension ring 225. Collar extension ring 225 may be annular and may be secured to collar 213 by one or more bolts and one or more spacers as further discussed below.

Collar 213 may, in some embodiments, include piston bolt cutouts 227 positioned to allow piston bolts 177, described above, to pass therethrough. Piston bolt cutouts 227 and collar extension ring 225 may together form a captive slot for piston bolts 177. The overall length between the ends of piston bolt cutouts 227 and collar extension ring 225 may define the amount of longitudinal distance collar 213 is allowed to extend before collar extension ring 225 contacts piston bolts 177. As further described below, further extension of collar 213 once piston bolts 177 contact collar extension ring 225 may cause longitudinal movement of piston 169 and thus compression of seal assembly 193. Likewise, in some embodiments, contact between piston bolts 177 and the ends of piston bolt cutouts 227 during retraction of collar 213 may cause longitudinal movement of piston 169 and thus retract the piston 169 into unset configuration.

In some embodiments, collar extension ring 225 may be mechanically coupleable to collar 213 such that the spacing between collar extension ring 225 and collar 213, and thus the overall length of the assembly of collar 213 and collar extension ring 225, may be selectively set. In some embodiments, by selecting the spacing between collar extension ring 225 and collar 213 and by selecting the axial length of collar extension ring 225, the distance of extension of collar 213 prior to contact between collar extension ring 225 and piston bolts 177 and thus the amount of compression of seal assembly 193 may be set as needed. Selection of these parameters may be made based on, for example and without limitation, variations in required stroke of linear actuators 219, the amount of radial compression of seal rings 195, and to account for variations in manufacturing and compositions of metal and elastomeric components of coupler assembly 100.

Figure 14:
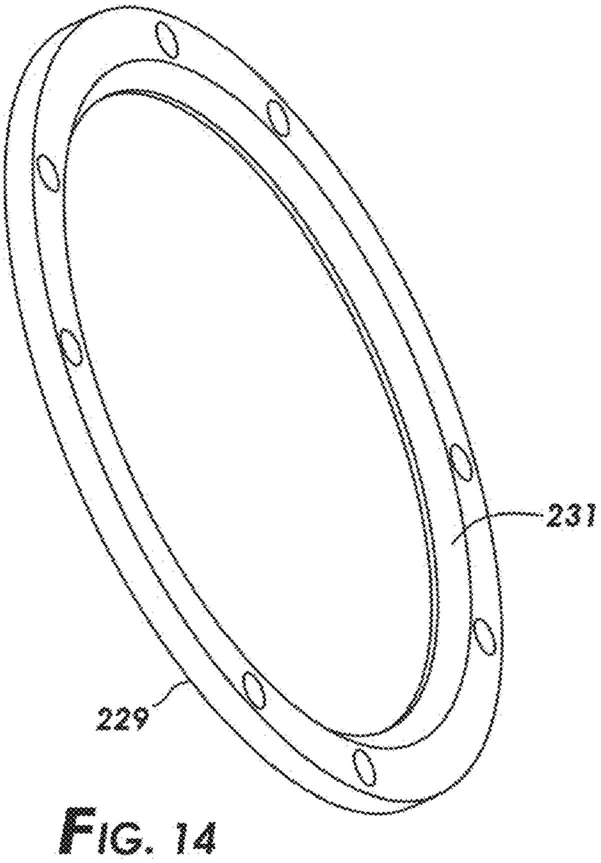
FIG. 14 depicts an end ring consistent with at least one embodiment of the present disclosure.

Coupler assembly 100, in some embodiments, may include end ring 229 as shown in FIG. 14. End ring 229 may be annular and may mechanically couple to female coupler body 137. End ring 229 may include chamfer 231. Chamfer 231 may, for example and without limitation, assist with alignment of male coupler body 107 during insertion to female coupler assembly 131 and may serve to limit wear on other components of female coupler assembly 131.

Figure 15:
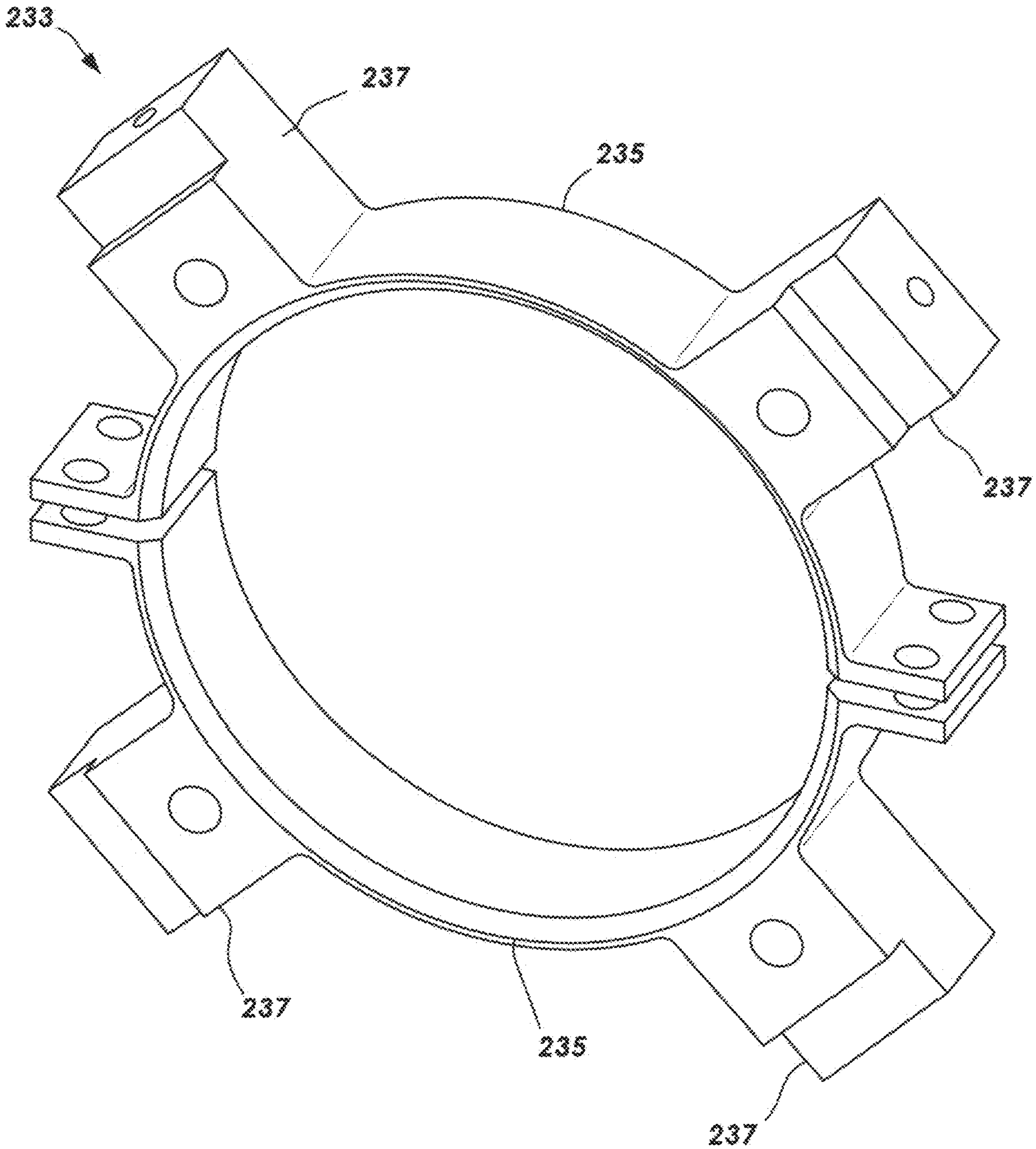
FIG. 15 depicts a perspective view of a clamp assembly consistent with at least one embodiment of the present disclosure.

With reference to FIG. 15, coupler assembly 100 may include clamp assembly 233. Clamp assembly 233 may couple to an outer surface of female coupler body 137 by clamping two or more clamps 235 about female coupler body 137. Clamp assembly 233 may, in some embodiments, include actuator support brackets 237. Each actuator support bracket 237 may include features to allow the coupling of a corresponding linear actuator 219 thereto and may thus support linear actuators 219 relative to female coupler body 137.

Figure 16:
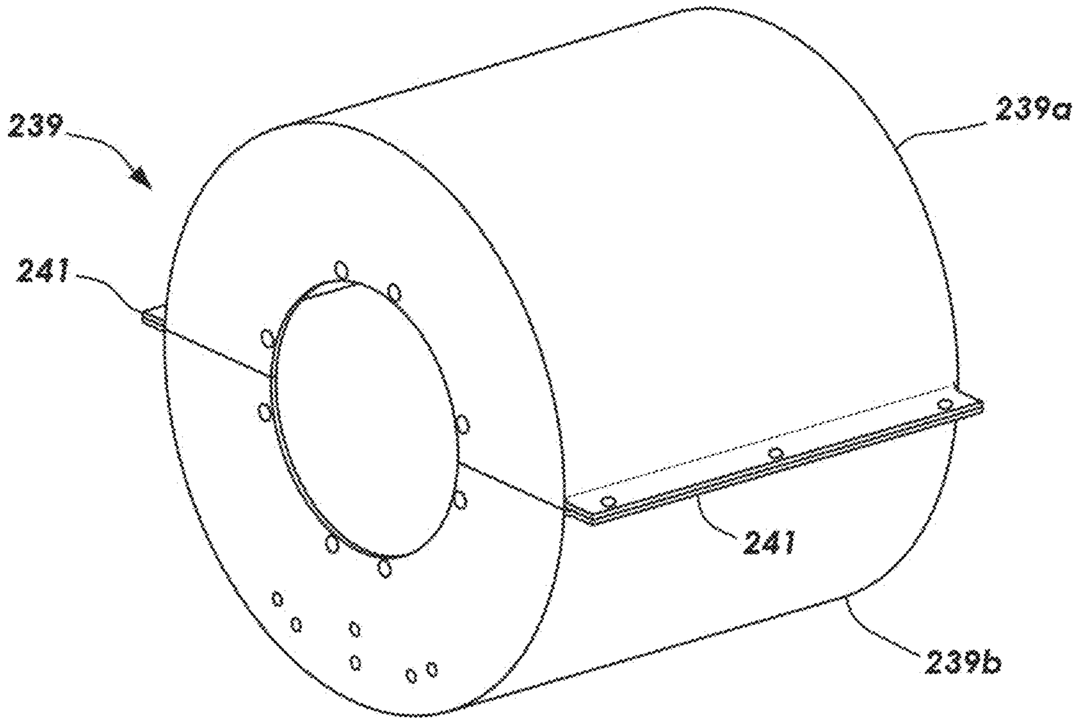
FIG. 16 depicts a perspective view of an outer cover consistent with at least one embodiment of the present disclosure.
Figure 16A:
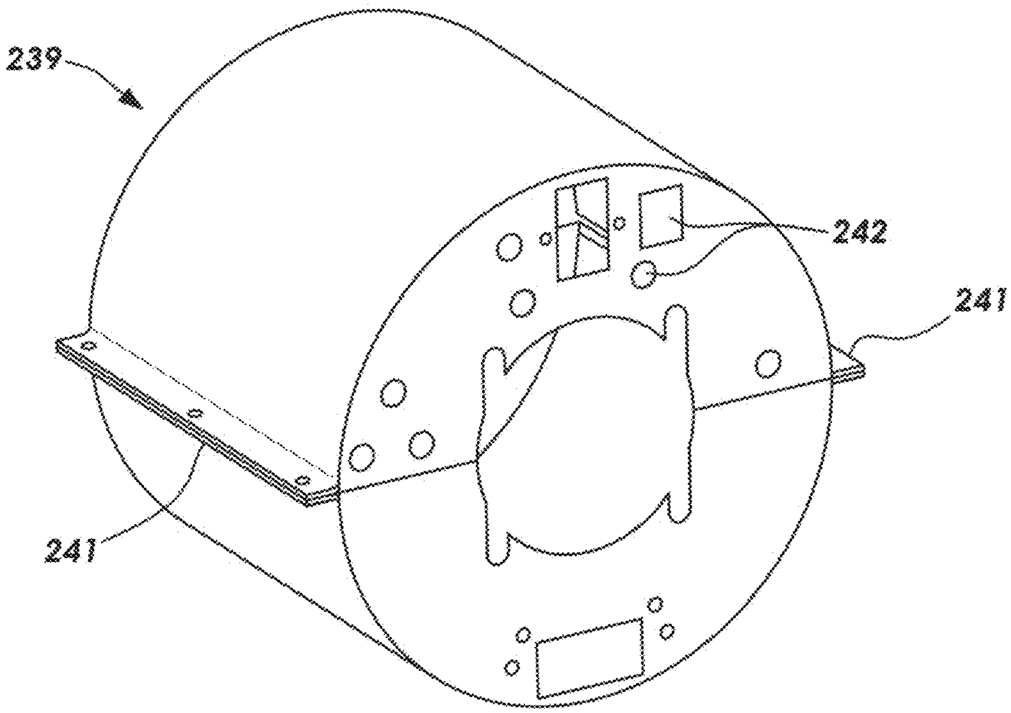
FIG. 16A depicts an alternate perspective view of the outer cover of FIG. 16.

In some embodiments, with reference to FIGS. 16, 16A, coupler assembly may include outer cover assembly 239. Outer cover assembly 239 may mechanically house the components of female coupler assembly 131. In some embodiments, outer cover assembly 239 may be formed as two cover halves, 239*a*, 239*b*. in some embodiments, cover halves 239*a*, 239*b* may mechanically couple to end ring 229. In some embodiments, cover halves 239*a*, 239*b* may be mechanically coupled to each other by, for example and without limitation, cover flanges 241.

Figure 17:
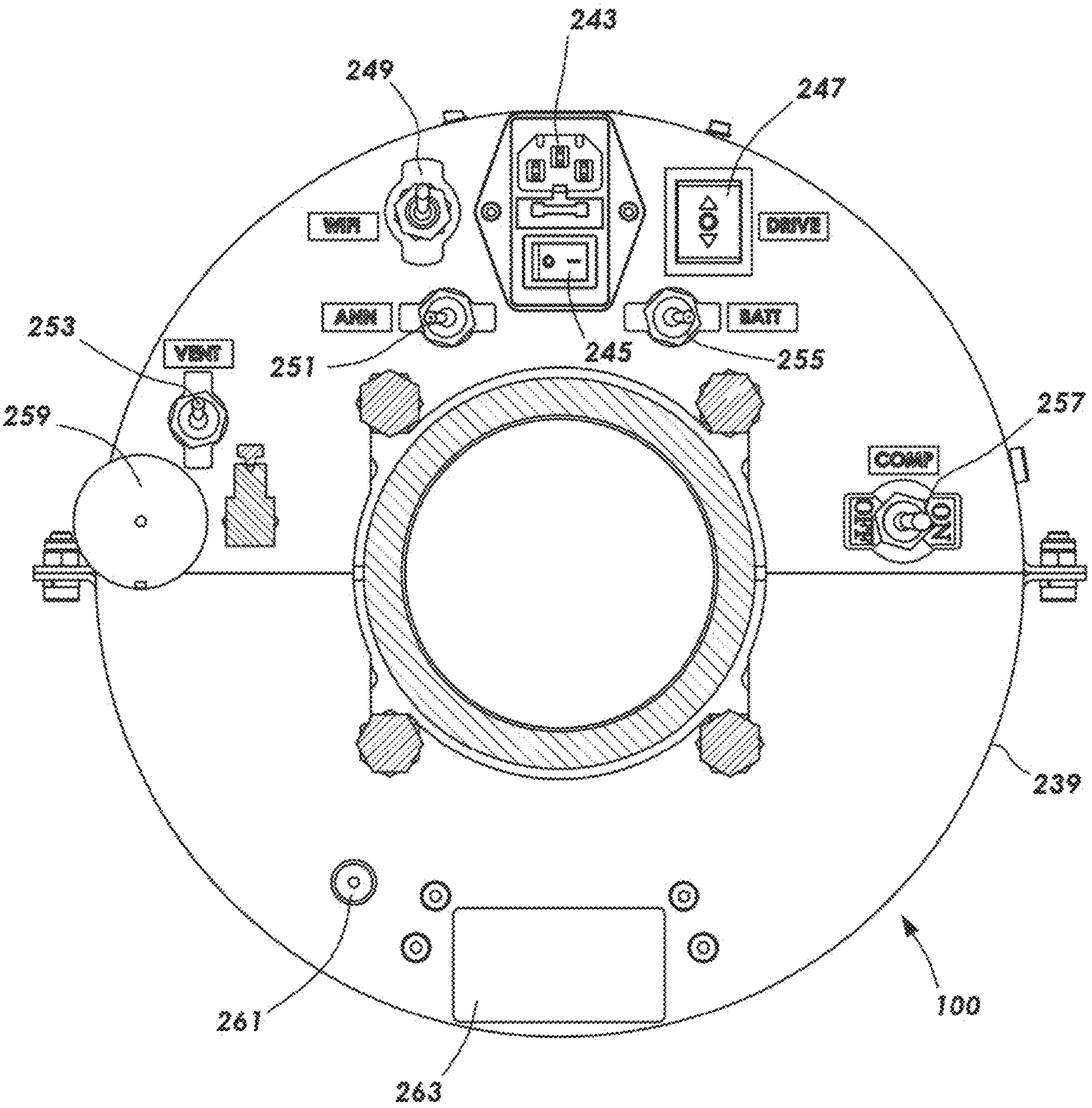
FIG. 17 depicts an end view of a coupler assembly consistent with at least one embodiment of the present disclosure.

In some embodiments, outer cover assembly 239 may include one or more cutouts 242 for control interface components as shown in FIG. 16A. Control interface components may include one or more switches, buttons, electrical connections, pneumatic connections, hydraulic connections, gauges, or other components used to interact with coupler assembly 100. With reference to FIG. 17, control interface components may include, for example and without limitation, one or more of power socket 243, power switch 245, coupler engagement control switch 247, Wi-Fi toggle switch 249, seal test valve toggle switch 251, vent valve toggle switch 253, battery switch 255, compressor switch 257, pressure gauge 259, battery charging port 261, and battery level indicator 263. Depending on the configuration of coupler assembly 100, one or more of these control interface components may be omitted or substituted for other components.

In some embodiments, coupler assembly 100 may be controllable locally using, for example and without limitation, one or more control interface components as discussed above. In some embodiments, coupler assembly 100 may be controllable remotely. In such an embodiment, one or more wired or wireless data communications interfaces may be installed to coupler assembly 100 to allow for remote operation and monitoring of coupler assembly 100. For example, in some embodiments, coupler assembly 100 may include data module 271 as shown in FIG. 4. Data module 271 may allow for interface between coupler assembly 100 and remote control equipment by, for example and without limitation, one or more of a wired connection or a wireless connection including, for example and without limitation, one or more of Wi-Fi, cellular, satellite, or other radio communication protocol.

In some embodiments, coupler assembly 100 may rely on an external power source. In other embodiments, coupler assembly 100 may include internal power source 267, as shown in FIG. 4, such as a battery. Internal power source 267 or the external power source may be used, for example and without limitation, to power linear actuators 219 in order to set or unset coupler assembly 100.

Figure 18:
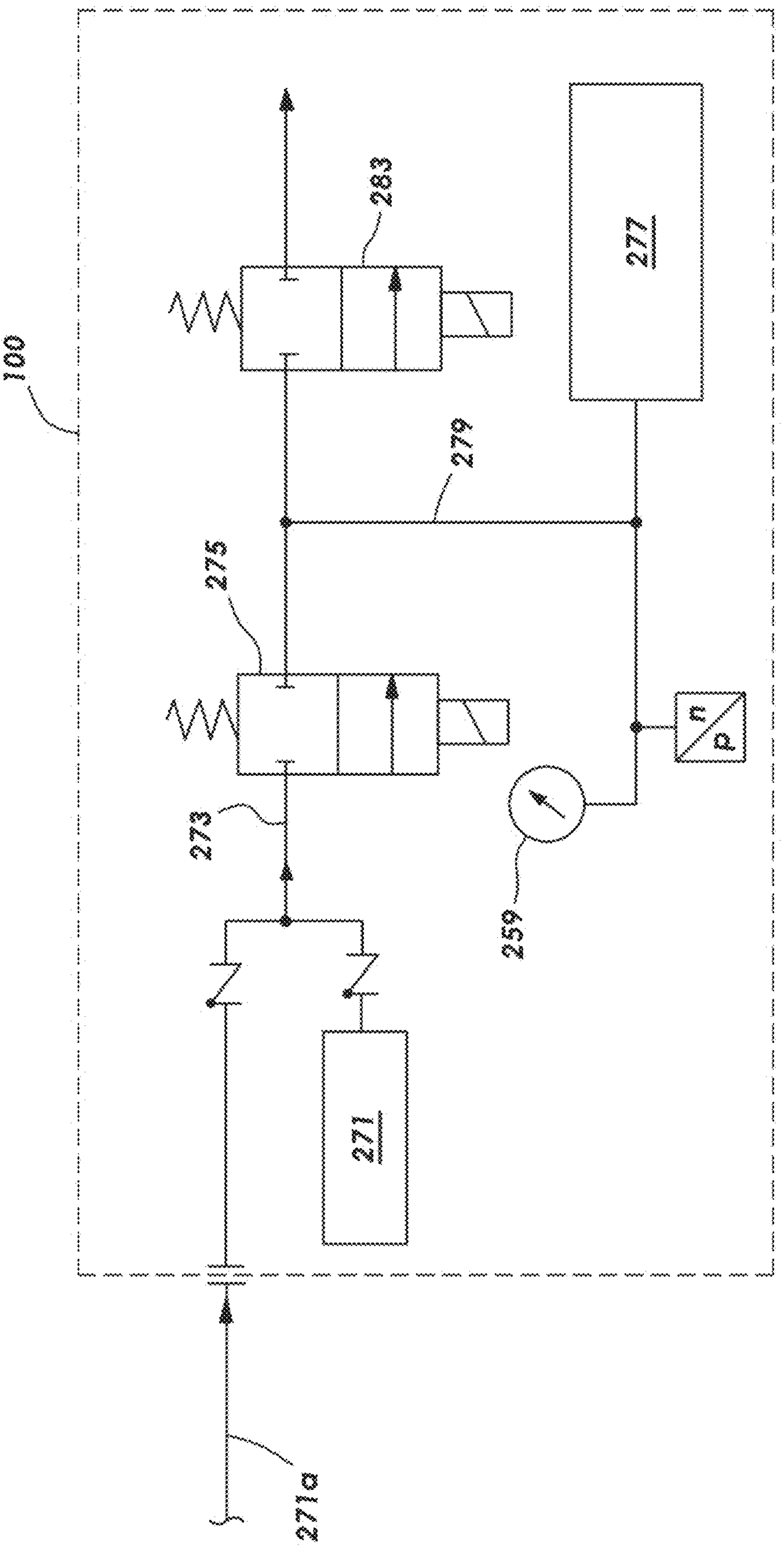
FIG. 18 depicts a schematic view of a seal test and monitoring system of a coupler assembly consistent with at least one embodiment of the present disclosure.

In some embodiments, coupler assembly 100 may include one or more systems for verifying the integrity of the seal between female coupler assembly 131 and male coupler assembly 101. For example, in some embodiments, coupler assembly 100 may include seal testing system 269 as shown in FIG. 18. Seal testing system 269 may include a source of compressed air such as an external compressed air line 271*a* or internal compressor 265 (shown in FIG. 6). Compressor 265 may output compressed air through supply line 273 to seal test valve 275. Seal test valve 275 may, in some embodiments, be an electrically actuated solenoid valve. The output of seal test valve 275 may be fluidly coupled to seal test connector 277 via test line 279. Seal test connector 277 may mechanically couple to seal testing port 181 of piston 169. Compressed air supplied to seal testing port 181 during testing may, for example and without limitation, be injected to seal assembly pocket 191. Compressed air may fill the annular space between seal rings 195 both within and without spacer 197 by passing through spacer seal testing hole 199. Where a good seal is formed between piston 169 and male coupler body 107 by seal rings 195, the pressure within the annular space between seal rings 195 will increase and will remain substantially constant. This pressure may be measured by pressure gauge 259 or pressure transducer. In the case of a bad seal, the measured pressure may substantially drop or increase, indicating that male coupler assembly 101 is not fully sealed with two or more seal rings 195 to female coupler assembly 131 and fluid should not be introduced.

For example, if the seal ring 195 between the annular space between seal rings 195 and the atmosphere is improperly seated, the test pressure may drop to atmospheric pressure. If only the seal ring 195 between the annular space between seal rings 195 and the interior of coupler assembly 100 is improperly seated, the test pressure may drop or increase to the pressure of the fluid in the bore of coupler assembly 100.

In some embodiments in which three seal rings 195 and two spacers 197 are used, seal testing system 269 may include additional components to allow the annulus defined about each spacer 197 to be tested independently, thus allowing the failed seal to be identified.

Once the seal testing process is completed, the test pressure may be vented using vent valve 283, which may allow the test pressure to be vented to atmosphere.

In order to elucidate the operation of coupler assembly 100 further, a coupling operation consistent with at least one embodiment of the present disclosure will now be described with reference to FIGS. 19-24. For the sake of clarity, some reference numerals are omitted from these drawings.

Figure 19:
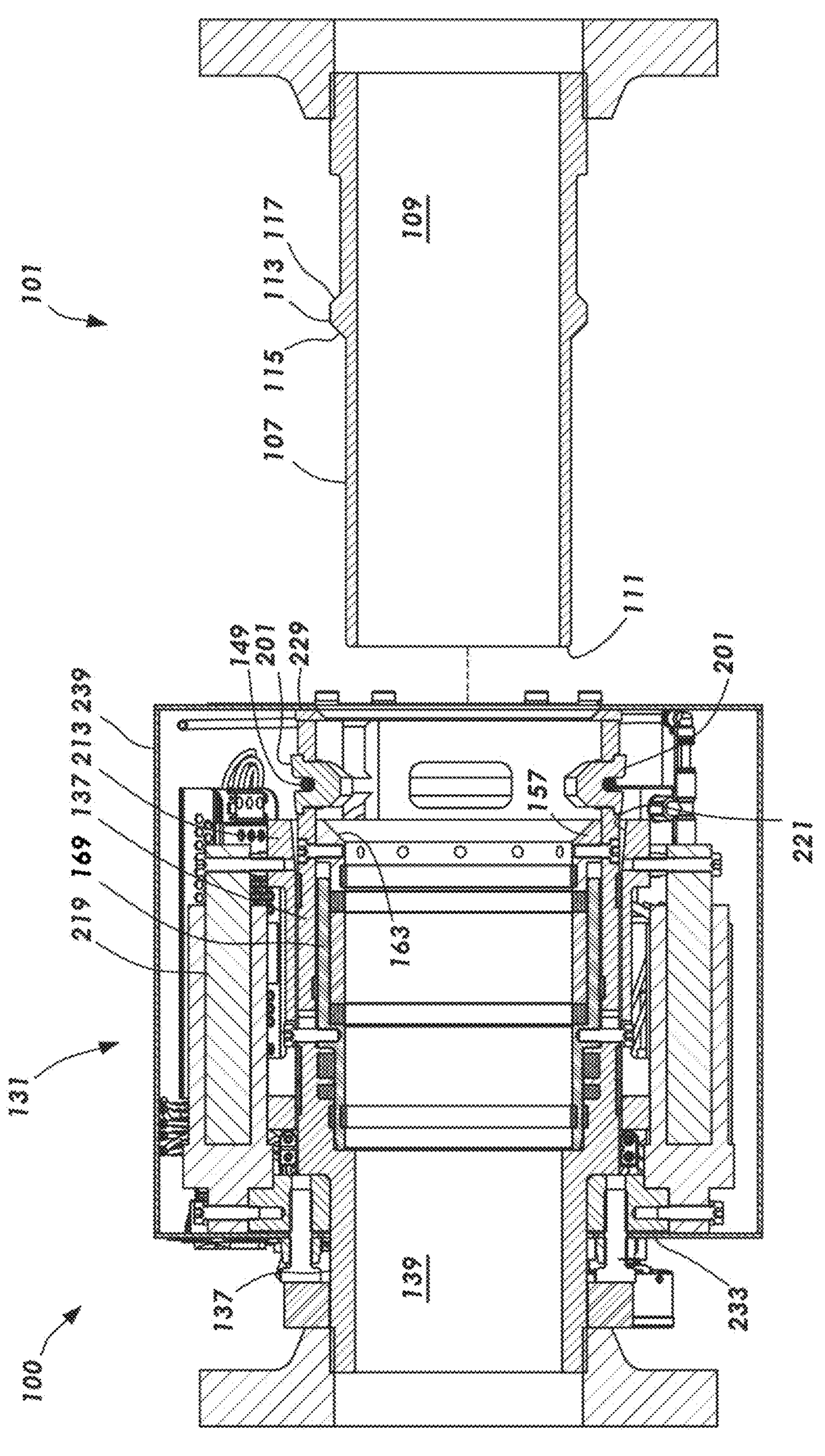
FIGS. 19-24 depict a coupling operation of a coupler assembly consistent with at least one embodiment of the present disclosure.

Female coupler assembly 131 may initially be positioned in an unlocked configuration as shown in FIG. 19 with male coupler assembly 101 separated therefrom. As will be understood by one having ordinary skill in the art, female coupler assembly 131 may be coupled to an external piece of equipment such as a supply pipe and male coupler assembly 101 may be coupled to an external piece of equipment such as a manifold. Such connections will vary depending on the requirements of the installation.

Figure 20:
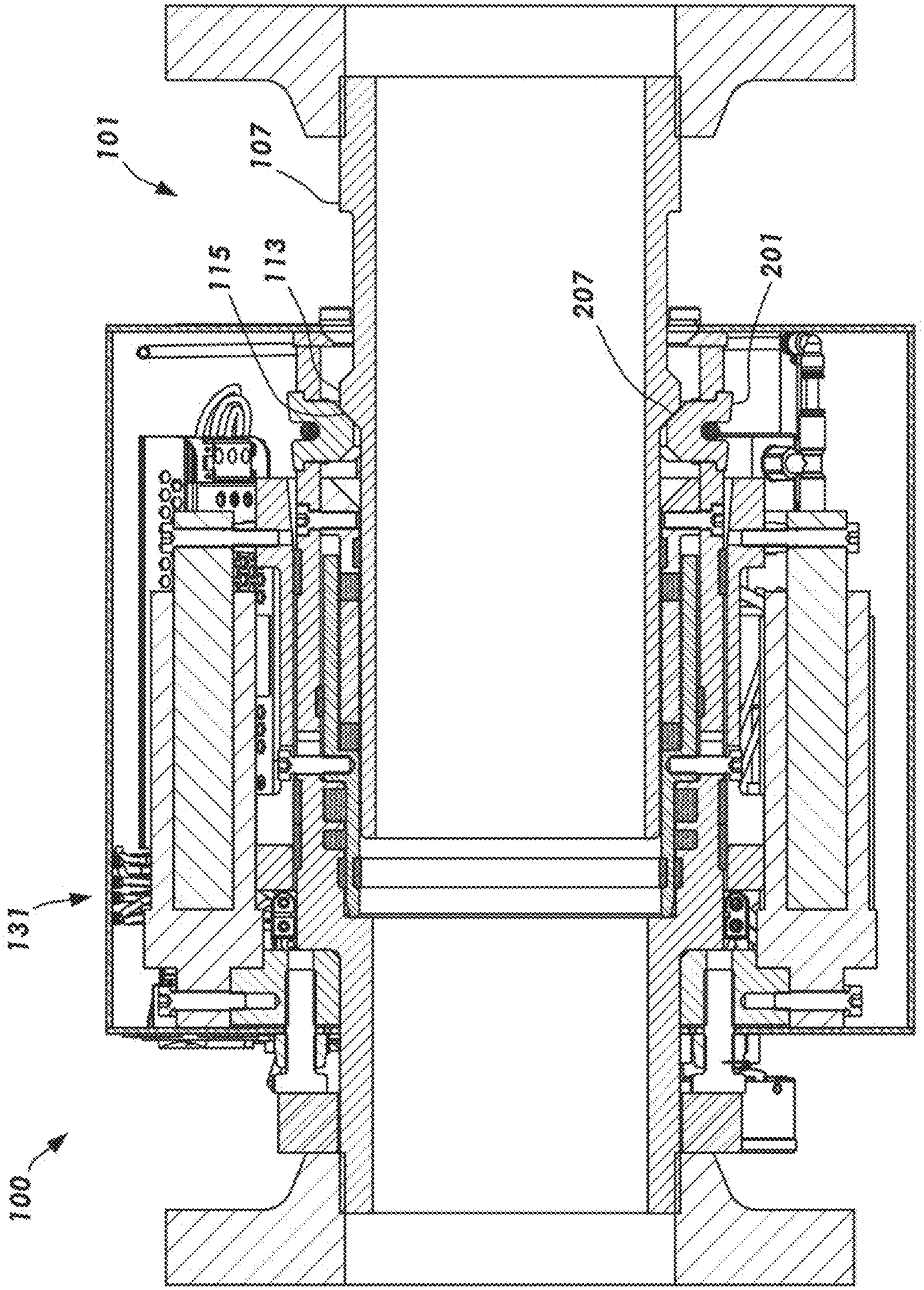
Figure 21:
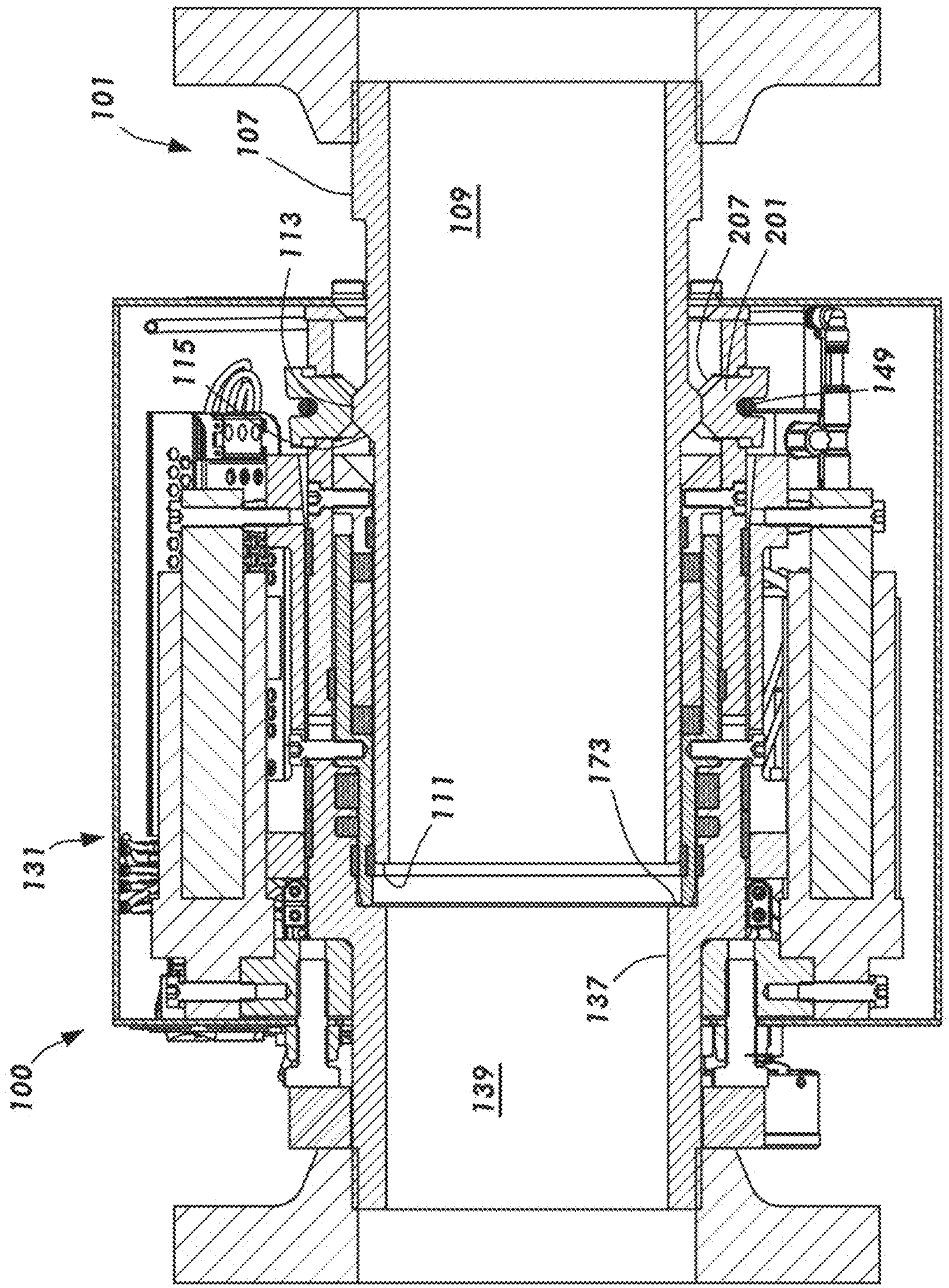

Male coupler assembly 101 may then be inserted into female coupler assembly 131. Male coupler body 107 may pass through end ring 229, which may assist with such insertion. Male coupler body 107 may continue to be inserted as shown in FIG. 20 until locking ring 113 contacts locking dogs 201. Front tapered surface 115 of locking ring 113 engages front camming surfaces 207 of locking dogs 201. Continued insertion of male coupler body 107 causes locking dogs 201 to be moved radially outward against the biasing force of retaining ring 149 until locking ring 113 may pass through locking dogs 201 as shown in FIG. 21.

Figure 22:
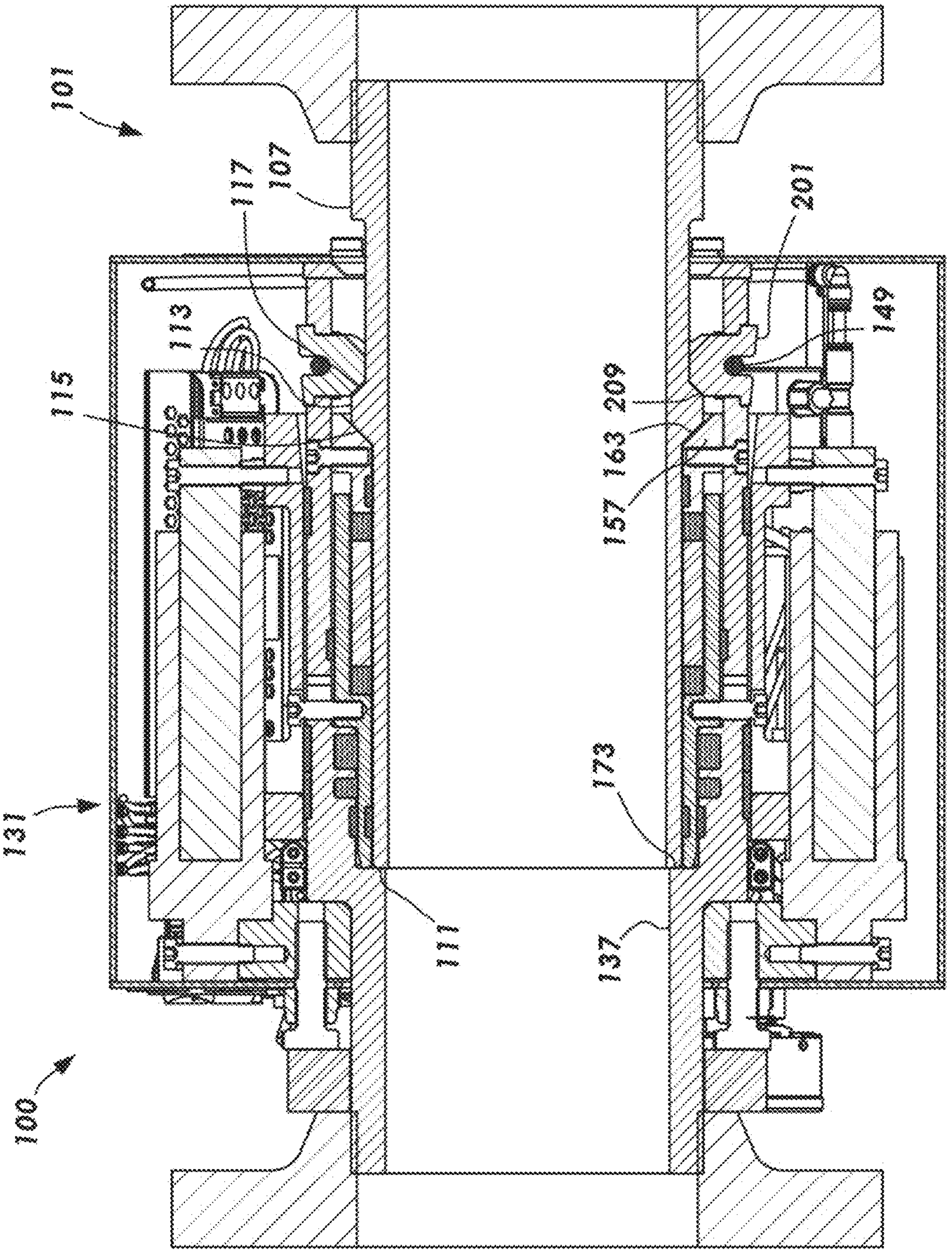

Male coupler body 107 may continue to be inserted until locking ring 113 passes locking dogs 201, at which time rear tapered surface 117 of locking ring 113 engages rear camming surfaces 209 of locking dogs 201 as shown in FIG. 22 as locking dogs 201 are biased radially inward by retaining ring 149. In some embodiments, once male coupler body 107 is fully inserted, front tapered surface 115 of locking ring 113 may, in some embodiments, engage against landing face 163 of inner ring 157. In some embodiments, end face 111 of male coupler body 107 may engage against stop shoulder 173 of female coupler body 137. Positive physical contact between front tapered surface 115 and landing face 163 and/or end face 111 and stop shoulder 173 provides resistance to further longitudinal insertion of male coupler body 107, and the physical contact between rear tapered surface 117 and rear camming surfaces 209 of locking dogs 201 provides resistance to longitudinal retraction of male coupler body 107. Thus, positive, tactile confirmation of full insertion of male coupler body 107 may be identified. In some embodiments, positive confirmation of full insertion may be obtained by a sensor, such as, for example and without limitation a linear variable differential transformer or any other proximity sensor.

Figure 23:
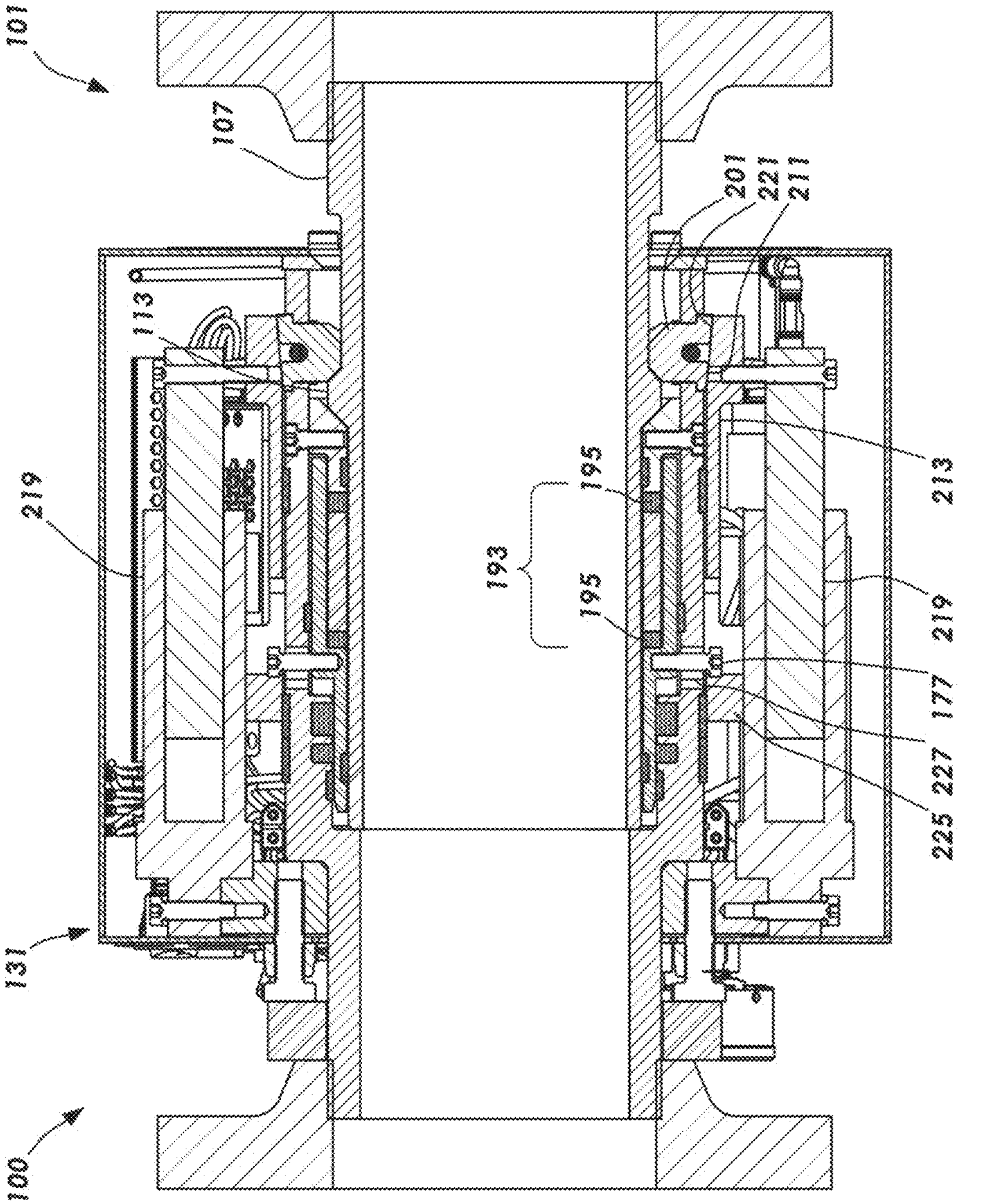

As shown in FIG. 23, linear actuators 219 may then be activated to cause extension of collar 213. As collar 213 is extended, forcing cone 221 may engage tapered outer surfaces 211 of locking dogs 201 and may prevent radial movement of locking dogs 201, thus securing locking dogs 201 against locking ring 113 and preventing longitudinal movement of male coupler body 107 out of female coupler assembly 131. In some embodiments, as forcing cone 221 engages tapered outer surfaces 211 of locking dogs 201, locking dogs 201 may be forced radially inward into further engagement with locking ring 113, thereby ensuring full insertion of male coupler body 107.

Figure 24:
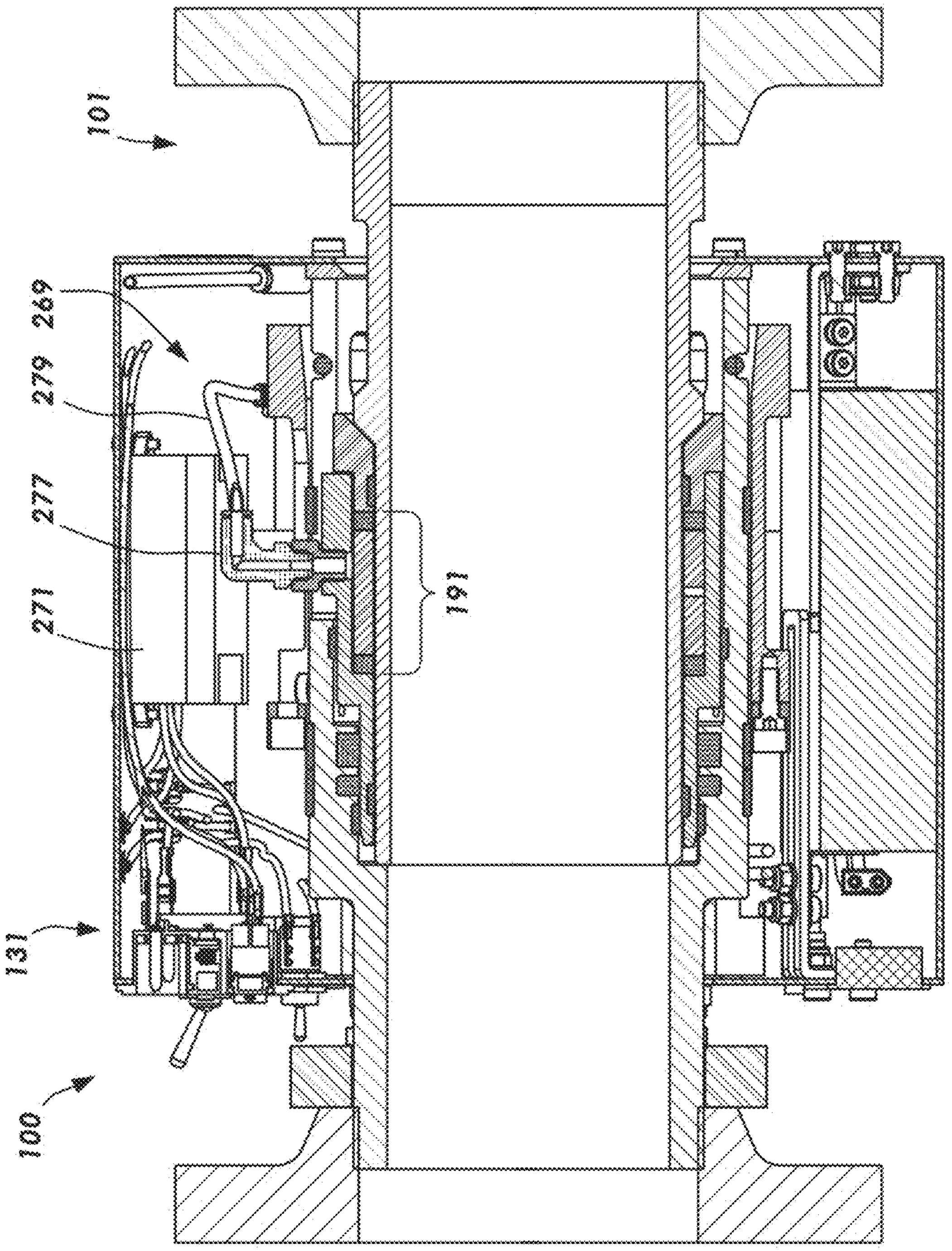

Additionally, during the extension of collar 213, piston bolts 177 may travel through piston bolt cutouts 227 until collar extension ring 225 contacts piston bolts 177. Further extension of collar 213 may cause longitudinal movement of piston 169 further into engagement with seal assembly 193, and may thus cause longitudinal compression of and thereby cause radial extension of seal rings 195. As discussed above, by selecting the spacing of collar extension ring 225 and collar 213, the amount of compression of seal rings 195 may be selected such that seal rings 195 are compressed to a desired extent when collar 213 is in the fully extended position. With reference to FIG. 24, seal testing system 269 may then be operated by providing compressed air through seal test connector 277 to seal assembly pocket 191. In the case that the seal testing operation is successful, an operator may know that male coupler assembly 101 is fully seated to female coupler assembly 131 and a reliable double seal is formed. In the case that the seal testing operation is unsuccessful, an operator may know that a double seal is not formed and intervention is necessary.

Once it is desired to disconnect male coupler assembly 101 and female coupler assembly 131, the above operation may be reversed. By retracting collar 213 using linear actuators 219, locking dogs 201 may be released as the retraction of collar 213 may allow radial displacement of locking dogs 201. As collar 213 is retracted and the force on piston 169 is reduced, seal rings 195 may return elastomerically to their original configuration, thus releasing the seal between male coupler assembly 101 and female coupler assembly 131. Additionally, once piston bolts 177 engage the ends of piston bolt cutouts 227, piston 169 may be further longitudinally moved away from seal assembly 193 and moved into its original position. Once collar 213 is fully retracted, male coupler body 107 may be longitudinally removed from female coupler assembly 131.

Coupler assembly 100 may be used in any installation whereby automated, reliable connections are beneficial including, for example and without limitation, offshore/subsea, underground mining, nuclear piping, sanitary piping, hydrogen piping, food and dairy, chemical or fuel transfer, and other industrial applications.

Figure 25:
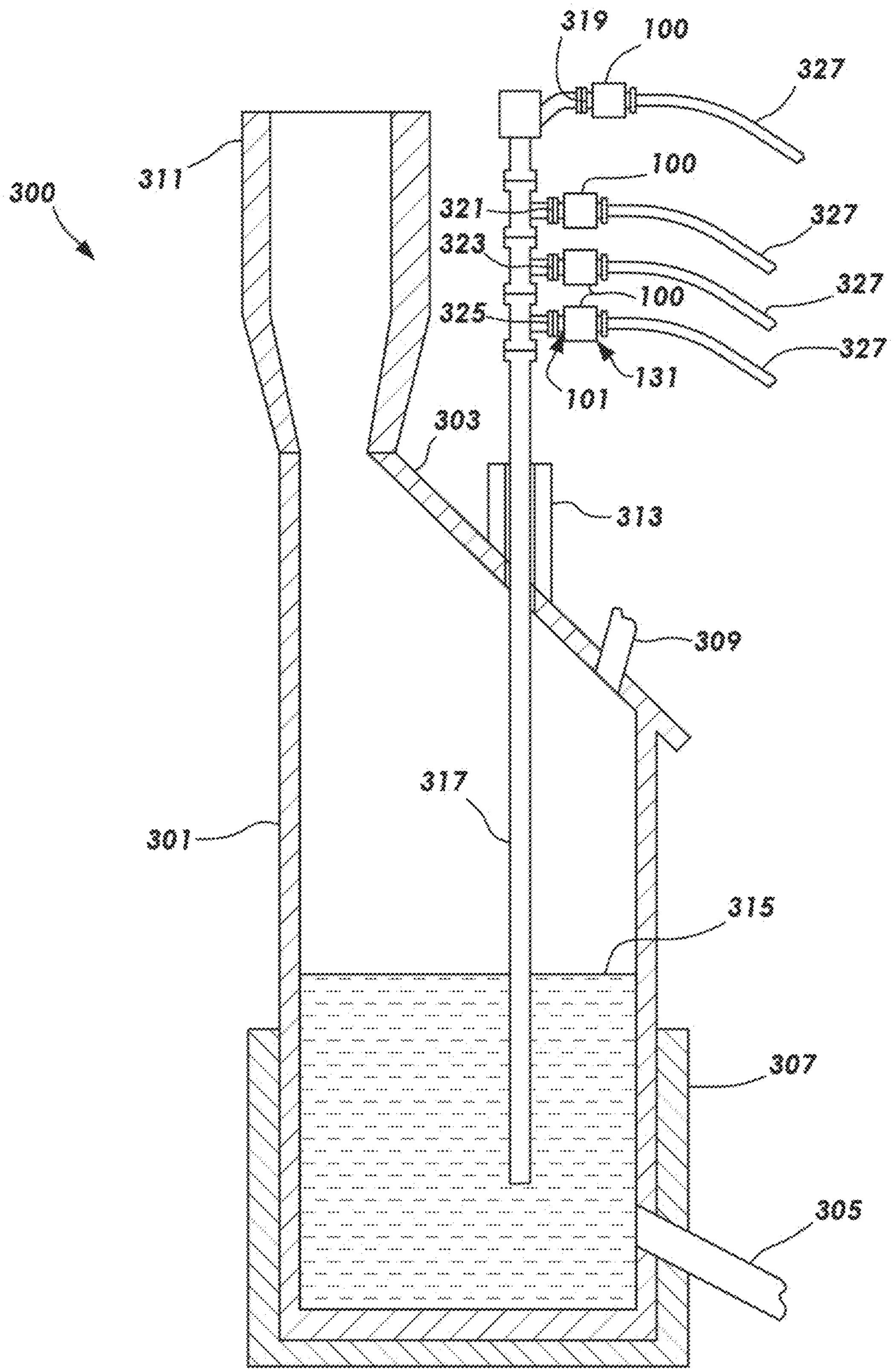
FIG. 25 depicts an elevation schematic view of a top submerged lancing furnace including coupler assemblies consistent with at least one embodiment of the present disclosure.

For example, FIG. 25 depicts an example of a use case for coupler assembly 100. FIG. 25 depicts top submerged lancing (TSL) furnace 300. As understood in the art, TSL furnace 300 may be used in the production of a variety of metals including, for example and without limitation, for the smelting of lead, tin, copper, zinc, nickel, and PGMs. TSL furnace 300 may include furnace shell 301, roof 303, tapping hole 305, base 307, feed port 309, offgas system 311, and lance port 313. Furnace shell 301 may receive raw ore of metals and other compounds through feed port 309 to produce molten bath 315. During operation, lance 317 may be extended into furnace shell 301 through lance port 313. Lance 317 may be at least partially submerged into molten bath 315, and a sustained combustion from the end of lance 317 may be used to melt and smelt the ores in molten bath 315. Lance 317 may be supplied with a plurality of gases to feed the sustained combustion at the end of lance 317 via ports at the upper end of lance 317 including, for example and without limitation, fuel port 319, lance oxygen port 321, lance air port 323, and shroud air port 325, each coupled to an associated supply line 327.

During routine operation of TSL furnace 300, due to the high temperatures, degrading environment, and close proximity and submersion into molten bath 315, lance 317 is worn when continually lowered further into molten bath 315. Once lance 317 is sufficiently worn, lance 317 must be replaced. During changeover operations of lance 317, fuel port 319, lance oxygen port 321, lance air port 323, and shroud air port 325 must be disconnected from the associated supply lines 327, a new lance 317 must be provided, and the connections between the new fuel port 319, lance oxygen port 321, lance air port 323, and shroud air port 325 with the associated supply lines 327 must be remade. During this time, TSL furnace 300 is still on standby involving high temperatures and potentially the presence of other hazardous conditions including toxic gases. Additionally, the downtime incurred during this changeover process may be costly to the operator of TSL furnace 300, and extended downtime may degrade the quality of the product or may result in decreased efficiency in the operation of TSL furnace 300.

Typical connectors may require an operator or operators to stay at a position in proximity to the consumed lance 317 for extended periods of time. Additionally, without the ability to positively identify that an adequate seal has been made and that each connection is mechanically secure, fuel, oxygen, air, or other gases associated with lance 317 may be vented to the surrounding, hazardous environment, leading to potential damage to equipment or injury or death to operators in close proximity.

In some embodiments of the present disclosure, fuel port 319, lance oxygen port 321, lance air port 323, and shroud air port 325 may each include coupler assembly 100 as described herein. For example, in some such embodiments, new lance 317 may be supplied such that each of fuel port 319, lance oxygen port 321, lance air port 323, and shroud air port 325 is coupled to a respective male coupler assembly 101, and each of the associated supply lines 327 may be coupled to a respective female coupler assembly 131. In such an embodiment, each connection may be made as outlined above, remotely or on-site, such that positive retention is ensured and with each seal being tested and continuously monitored for integrity. Additionally, because each connection using coupler assembly 100 as described herein is automated, the amount of downtime incurred may be reduced relative to traditional methods of making up and breaking out such connections.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A coupler assembly comprising:

a male coupler assembly, the male coupler assembly including a male coupler body, the male coupler body being tubular, the interior of the male coupler body forming a male bore, the male coupler body including a locking ring, the locking ring being an annular protrusion from the outer surface of the male coupler body;

a female coupler assembly, the female coupler assembly comprising:

a female coupler body, the female coupler body being tubular, the interior of the female coupler forming a female bore, the female coupler body comprising a receiving socket adapted to receive the male coupler assembly;

a locking dog, the locking dog adapted to be received by a locking dog aperture formed in the female coupler body, the locking dog positioned to abut the locking ring when the male coupler assembly is fully inserted into the female coupler assembly;

a piston, the piston being generally tubular, the piston positioned within the receiving socket, the piston longitudinally slidable relative to the female coupler body;

an inner ring, the inner ring positioned within the receiving socket and coupled to the female coupler body such that the annular space defined by the piston and the inner ring about the male coupler body defines a seal assembly pocket;

a seal assembly positioned within the seal assembly pocket, the seal assembly including two or more seal rings and one or more spacers positioned between the seal rings;

a collar, the collar being tubular and positioned about the receiving socket of the female coupler body, the collar longitudinally slidable relative to the female coupler body; and a linear actuator, the linear actuator coupled to the female coupler body and the collar such that extension of the linear actuator causes the collar to move from an unlocked position to a locked position such that the collar abuts the locking dog when in the locked position and such that the piston is moved from an unsealed to a sealed position in which the seal rings are longitudinally compressed when in the sealed position.

2. The coupler assembly of claim 1, wherein the male coupler body comprises an end face and the female coupler body comprises a stop shoulder such that the end face contacts the stop shoulder when the male coupler assembly is fully inserted into the female coupler assembly.

3. The coupler assembly of claim 1, further comprising a retaining ring, the retaining ring being elastomeric, the retaining ring extending about the female coupler body and the locking dog such that the retaining ring biases the locking dog radially inward such that the locking dog is able to extend radially outward as the locking ring is abutting the locking dog while the male coupler assembly is inserted into or removed from the female coupler assembly and the locking dog is biased radially inward when the locking ring is not aligned with the locking dog.

4. The coupler assembly of claim 3, wherein the female coupler body includes a retaining ring groove and the locking dog includes a retaining ring groove, each adapted to hold the retaining ring.

5. The coupler assembly of claim 1, wherein the locking dog comprises a front camming surface and a rear camming surface and the locking ring comprises a front tapered surface and a rear tapered surface such that the front camming surface and front tapered surface abut while the male coupler assembly is inserted into the female coupler assembly, and such that the rear camming surface and the rear tapered surface abut while the male coupler assembly is fully inserted into the female coupler assembly.

6. The coupler assembly of claim 1, further comprising a piston bolt, the piston bolt coupled to the piston, the piston bolt extending through a piston bolt slot formed in the female coupler body, the piston bolt extending into a piston bolt cutout formed in the collar such that the piston is moved once the piston bolt engages the end of the piston bolt cutout as the collar is moved to the locked position.

7. The coupler assembly of claim 1, wherein the piston further comprises a seal testing port formed therethrough at a position aligned with the seal assembly pocket.

8. The coupler assembly of claim 7, wherein the piston further comprises a boss, the seal testing port formed through the boss, the boss extending through a longitudinal slot formed in the female coupler body and a longitudinal slot formed in the collar.

9. The coupler assembly of claim 8, further comprising a seal testing system.

10. The coupler assembly of claim 9, wherein the seal testing system comprises a source of compressed air, a seal test valve coupled between the source of compressed air and the seal testing port, a vent valve coupled between the seal testing port and the atmosphere, and a gauge or transducer positioned to measure the pressure within the seal assembly pocket.

11. The coupler assembly of claim 10, further comprising a compressor.

12. The coupler assembly of claim 1, further comprising a battery.

13. The coupler assembly of claim 1, further comprising an end ring, the end ring coupled to the female coupler body.

14. The coupler assembly of claim 1, further comprising a clamp assembly, the clamp assembly coupled to the female coupler body and the linear actuator.

15. The coupler assembly of claim 1, further comprising an outer cover assembly.

16. A method comprising:

coupling a male coupler assembly of a coupler assembly to a first piece of equipment at a first end connection of the coupler assembly, wherein the male coupler assembly comprises a male coupler body, the male coupler body being tubular, the interior of the male coupler body forming a male bore, the male coupler body including a locking ring, the locking ring being an annular protrusion from the outer surface of the male coupler body;

coupling a female coupler assembly of the coupler assembly to a second piece of equipment at a second end connection of the coupler assembly, wherein the female coupler assembly comprises:

a female coupler body, the female coupler body being tubular, the interior of the female coupler forming a female bore, the female coupler body comprising a receiving socket adapted to receive the male coupler assembly;

a locking dog, the locking dog adapted to be received by a locking dog aperture formed in the female coupler body, the locking dog positioned to abut the locking ring when the male coupler assembly is fully inserted into the female coupler assembly;

a piston, the piston being generally tubular, the piston positioned within the receiving socket, the piston longitudinally slidable relative to the female coupler body between an unsealed position and a sealed position;

an inner ring, the inner ring positioned within the receiving socket and coupled to the female coupler body such that the annular space defined by the piston and the inner ring about the male coupler body defines a seal assembly pocket;

a seal assembly positioned within the seal assembly pocket, the seal assembly including two or more seal rings and one or more spacers positioned between the seal rings;

a collar, the collar being tubular and positioned about the receiving socket of the female coupler body, the collar longitudinally slidable relative to the female coupler body between an unlocked position and a locked position; and a linear actuator, the linear actuator coupled to the female coupler body and the collar such that extension of the linear actuator causes the collar to move from an unlocked position to a locked position;

inserting the male coupler body into the female coupler body of the female coupler assembly and within the seal assembly;

engaging the locking ring to the locking dog;

forcing the locking dog radially outward such that the locking ring passes the locking dog;

engaging an end face of the male coupler body to a stop face of the female coupler body;

biasing the locking dog radially inwards by a retaining ring;

extending the linear actuator such that the collar is moved to the locked position;

engaging the collar to a tapered outer surface of the locking dog such that the locking dog is constrained against the rear tapered surface of the locking ring;

moving the piston to a sealed position such that the seal rings are axially compressed and expanded radially into abutment with the piston and the male coupler body; and forming a seal between the female coupler assembly and the male coupler assembly.

17. The method of claim 16, further comprising:

retracting the linear actuator;

moving the collar to the unlocked position such that the collar is out of engagement with the locking dog;

moving the piston to the unsealed position such that the seal rings are no longer axially compressed;

removing the male coupler body from the female coupler assembly such that the locking dog is moved radially outward by the locking ring until the locking ring has passed the locking dog.

18. The method of claim 16, further comprising:

opening a seal test valve such that compressed air is provided to the seal assembly pocket via a seal test port formed in the piston;

measuring the pressure within the seal test pocket; and identifying whether a good seal is maintained.

* * * * *